US012596334B2

(12) United States Patent
Davis et al.

(10) Patent No.: US 12,596,334 B2
(45) Date of Patent: Apr. 7, 2026

(54) CROWN FOR AN ELECTRONIC WATCH

(71) Applicant: Apple Inc., Cupertino, CA (US)

(72) Inventors: Richard A. Davis, San Carlos, CA (US); Devon K. Copeland, Cupertino, CA (US)

(73) Assignee: Apple Inc., Cupertino, CA (US)

(*) Notice: Subject to any disclaimer, the term of this patent is extended or adjusted under 35 U.S.C. 154(b) by 313 days.

(21) Appl. No.: 18/106,912

(22) Filed: Feb. 7, 2023

(65) Prior Publication Data

US 2024/0264569 A1 Aug. 8, 2024

(51) Int. Cl.
*G04G 21/00* (2010.01)
*G04G 9/00* (2006.01)

(52) U.S. Cl.
CPC ............ *G04G 21/00* (2013.01); *G04G 9/007* (2013.01)

(58) Field of Classification Search
CPC ........ G04G 21/00; G04G 9/007; G04G 21/08; G04C 3/001; G04C 3/002; G04C 3/005
See application file for complete search history.

(56) References Cited

U.S. PATENT DOCUMENTS

| | | | |
|---|---|---|---|
| 2,237,860 | A | 4/1941 | Bolle |
| 2,288,215 | A | 6/1942 | Taubert et al. |
| 2,497,935 | A | 2/1950 | Feurer |
| 2,771,734 | A | 11/1956 | Morf |
| 2,788,236 | A | 4/1957 | Kafowi |
| 2,797,592 | A | 7/1957 | Marrapese |
| 3,040,514 | A | 6/1962 | Dinstman |
| 3,056,030 | A | 9/1962 | Kelchner |
| 3,130,539 | A | 4/1964 | Davis |
| 3,355,873 | A | 12/1967 | Morf |
| 3,362,154 | A | 1/1968 | Perret |
| 3,410,247 | A | 11/1968 | Dronberger |
| 3,495,398 | A | 2/1970 | Widmer et al. |
| 3,577,876 | A | 5/1971 | Spadini |

(Continued)

FOREIGN PATENT DOCUMENTS

| | | |
|---|---|---|
| CH | 1888928 | 1/1937 |
| CN | 1302740 | 9/2001 |

(Continued)

OTHER PUBLICATIONS

U.S. Appl. No. 17/377,482, filed Jul. 16, 2021; pending.

(Continued)

*Primary Examiner* — Edwin A. Leon
(74) *Attorney, Agent, or Firm* — Brownstein Hyatt Farber Schreck, LLP

(57) ABSTRACT

An electronic watch may include a housing defining a side wall, a display, a front cover positioned over the display, and an input system configured to receive a rotational input and a translational input. The input system may include a switch element positioned within the housing and defining a first opening along a top of the switch element, a crown including a knob external to the housing, and a shaft assembly coupled to the knob and extending through a second opening in the side wall of the housing and through the first opening in the switch element, the shaft assembly defining an actuation feature configured to actuate the switch element in response to the translational input, and a rotation sensing system configured to detect the rotational input.

20 Claims, 19 Drawing Sheets

(56) References Cited

U.S. PATENT DOCUMENTS

| | | | |
|---|---|---|---|
| 3,621,649 | A | 11/1971 | Vulcan et al. |
| 3,662,618 | A | 5/1972 | Kroll et al. |
| 3,733,803 | A | 5/1973 | Hiraga |
| 3,937,002 | A | 2/1976 | Van Haften |
| 4,007,347 | A | 2/1977 | Haber |
| 4,031,341 | A | 6/1977 | Wuthrich et al. |
| 4,037,068 | A | 7/1977 | Gaynor |
| 4,051,665 | A | 10/1977 | Arn |
| 4,077,200 | A | 3/1978 | Schneider |
| 4,133,404 | A | 1/1979 | Griffin |
| 4,170,104 | A | 10/1979 | Yamagata |
| 4,258,096 | A | 3/1981 | LaMarche |
| 4,274,152 | A | 6/1981 | Ikegami |
| 4,287,400 | A | 9/1981 | Kitik |
| 4,289,400 | A | 9/1981 | Kubola et al. |
| 4,311,026 | A | 1/1982 | Ochoa |
| 4,311,990 | A | 1/1982 | Burke |
| 4,324,956 | A | 4/1982 | Sakakino et al. |
| 4,345,119 | A | 8/1982 | Latasiewicz |
| 4,364,674 | A | 12/1982 | Tesch |
| 4,379,642 | A | 4/1983 | Meyrat |
| 4,395,134 | A | 7/1983 | Luce |
| 4,396,298 | A | 8/1983 | Ripley |
| 4,417,824 | A | 11/1983 | Paterson et al. |
| 4,448,199 | A | 5/1984 | Schmid |
| 4,520,306 | A | 5/1985 | Kirby |
| 4,581,509 | A | 4/1986 | Sanford et al. |
| 4,600,316 | A | 7/1986 | Besson |
| 4,617,461 | A | 10/1986 | Subbarao et al. |
| 4,634,861 | A | 1/1987 | Ching et al. |
| 4,641,026 | A | 2/1987 | Garcia, Jr. |
| 4,670,737 | A | 6/1987 | Rilling |
| 4,766,642 | A | 8/1988 | Gaffney et al. |
| 4,783,772 | A | 11/1988 | Umemoto et al. |
| 4,884,073 | A | 11/1989 | Souloumiac |
| 4,914,831 | A | 4/1990 | Kanezashi et al. |
| 4,922,070 | A | 5/1990 | Dorkinski |
| 4,931,794 | A | 6/1990 | Haag |
| 4,952,799 | A | 8/1990 | Loewen |
| 4,980,685 | A | 12/1990 | Souloumiac et al. |
| 4,987,299 | A | 1/1991 | Kobayashi et al. |
| 5,001,687 | A | 3/1991 | Brien |
| 5,034,602 | A | 7/1991 | Garcia et al. |
| 5,177,355 | A | 1/1993 | Branan |
| 5,214,278 | A | 5/1993 | Banda |
| 5,258,592 | A | 11/1993 | Nishikawa et al. |
| 5,288,993 | A | 2/1994 | Bidiville et al. |
| 5,347,123 | A | 9/1994 | Jackson et al. |
| 5,383,166 | A | 1/1995 | Gallay |
| 5,471,054 | A | 11/1995 | Watanabe |
| 5,477,508 | A | 12/1995 | Will |
| 5,509,174 | A | 4/1996 | Worrell |
| 5,559,761 | A | 9/1996 | Frenkel et al. |
| 5,572,314 | A | 11/1996 | Hyman et al. |
| 5,583,560 | A | 12/1996 | Florin et al. |
| 5,631,881 | A | 5/1997 | Pessey et al. |
| 5,726,645 | A | 3/1998 | Kamon et al. |
| 5,738,104 | A | 4/1998 | Lo |
| 5,748,111 | A | 5/1998 | Bates |
| 5,825,353 | A | 10/1998 | Will |
| 5,841,050 | A | 11/1998 | Clift et al. |
| 5,847,335 | A | 12/1998 | Sugahara et al. |
| 5,867,082 | A | 2/1999 | Van Zeeland |
| 5,943,233 | A | 8/1999 | Ebina |
| 5,953,001 | A | 9/1999 | Challener et al. |
| 5,960,366 | A | 9/1999 | Duwaer et al. |
| 5,963,332 | A | 10/1999 | Feldman et al. |
| 5,999,168 | A | 12/1999 | Rosenberg et al. |
| 6,069,567 | A | 5/2000 | Zawilski |
| 6,128,006 | A | 10/2000 | Rosenberg et al. |
| 6,134,189 | A | 10/2000 | Carrard |
| 6,154,201 | A | 11/2000 | Levin et al. |
| 6,175,679 | B1 | 1/2001 | Veligdan et al. |
| 6,203,190 | B1 | 3/2001 | Stotz |
| 6,241,684 | B1 | 6/2001 | Amano |
| 6,246,050 | B1 | 6/2001 | Tullis et al. |
| 6,252,825 | B1 | 6/2001 | Perotto |
| 6,304,247 | B1 | 10/2001 | Black |
| 6,355,891 | B1 | 3/2002 | Ikunami |
| 6,361,502 | B1 | 3/2002 | Puolakanaho et al. |
| 6,377,239 | B1 | 4/2002 | Isikawa |
| 6,392,640 | B1 | 5/2002 | Will |
| 6,396,006 | B1 | 5/2002 | Yokoji et al. |
| 6,422,740 | B1 | 7/2002 | Leuenberger |
| 6,477,117 | B1 | 11/2002 | Narayanaswami et al. |
| 6,502,982 | B1 | 1/2003 | Bach et al. |
| 6,525,278 | B2 | 2/2003 | Villain et al. |
| 6,556,222 | B1 | 4/2003 | Narayanaswami |
| 6,575,618 | B1 | 6/2003 | Inoue et al. |
| 6,587,400 | B1 | 7/2003 | Line |
| 6,636,197 | B1 | 10/2003 | Goldenberg et al. |
| 6,646,635 | B2 | 11/2003 | Pogatetz et al. |
| 6,661,438 | B1 | 12/2003 | Shiraishi et al. |
| 6,672,758 | B2 | 1/2004 | Ehrsam et al. |
| 6,794,992 | B1 | 9/2004 | Rogers |
| 6,809,275 | B1 | 10/2004 | Cheng et al. |
| 6,834,430 | B2 | 12/2004 | Worrell |
| 6,846,998 | B2 | 1/2005 | Hasumi et al. |
| 6,882,596 | B2 | 4/2005 | Guanter |
| 6,888,076 | B2 | 5/2005 | Hetherington |
| 6,896,403 | B1 | 5/2005 | Gau |
| 6,909,378 | B1 | 6/2005 | Lambrechts et al. |
| 6,914,551 | B2 | 7/2005 | Vidal |
| 6,950,695 | B2 | 9/2005 | Chen |
| 6,961,099 | B2 | 11/2005 | Takano et al. |
| 6,963,039 | B1 | 11/2005 | Weng et al. |
| 6,967,903 | B2 | 11/2005 | Guanter |
| 6,977,868 | B2 | 12/2005 | Brewer et al. |
| 6,982,930 | B1 | 1/2006 | Hung |
| 6,985,107 | B2 | 1/2006 | Anson |
| 6,987,568 | B2 | 1/2006 | Dana |
| 6,998,553 | B2 | 2/2006 | Hisamune et al. |
| 7,009,915 | B2 | 3/2006 | Brewer et al. |
| 7,016,263 | B2 | 3/2006 | Gueissaz et al. |
| 7,021,442 | B2 | 4/2006 | Borgerson |
| 7,022,974 | B2 | 4/2006 | Igaki et al. |
| 7,031,228 | B2 | 4/2006 | Born et al. |
| 7,034,237 | B2 | 4/2006 | Ferri et al. |
| 7,081,905 | B1 | 7/2006 | Raghunath et al. |
| 7,102,626 | B2 | 9/2006 | Denny, III |
| 7,106,307 | B2 | 9/2006 | Cok |
| 7,111,365 | B1 | 9/2006 | Howie, Jr. |
| 7,113,450 | B2 | 9/2006 | Plancon et al. |
| 7,119,289 | B2 | 10/2006 | Lacroix |
| 7,135,673 | B2 | 11/2006 | Saint Clair |
| 7,167,083 | B2 | 1/2007 | Giles |
| 7,187,359 | B2 | 3/2007 | Numata |
| 7,244,927 | B2 | 7/2007 | Huynh |
| 7,255,473 | B2 | 8/2007 | Hiranuma et al. |
| 7,265,336 | B2 | 9/2007 | Hataguchi et al. |
| 7,274,303 | B2 | 9/2007 | Dresti et al. |
| 7,285,738 | B2 | 10/2007 | Lavigne et al. |
| 7,286,063 | B2 | 10/2007 | Gauthey |
| 7,292,741 | B2 | 11/2007 | Ishiyama et al. |
| 7,358,481 | B2 | 4/2008 | Yeoh et al. |
| 7,369,308 | B2 | 5/2008 | Tsuruta et al. |
| 7,371,745 | B2 | 5/2008 | Ebright et al. |
| 7,385,874 | B2 | 6/2008 | Vuilleumier |
| 7,404,667 | B2 | 7/2008 | Born et al. |
| 7,465,917 | B2 | 12/2008 | Chin et al. |
| 7,468,036 | B1 | 12/2008 | Rulkov et al. |
| 7,474,592 | B2 | 1/2009 | Lyon |
| 7,506,269 | B2 | 3/2009 | Lang et al. |
| 7,520,664 | B2 | 4/2009 | Wai |
| 7,528,824 | B2 | 5/2009 | Kong |
| 7,545,367 | B2 | 6/2009 | Sunda et al. |
| 7,591,582 | B2 | 9/2009 | Hiranuma et al. |
| 7,593,755 | B2 | 9/2009 | Colando et al. |
| 7,605,846 | B2 | 10/2009 | Watanabe |
| 7,634,263 | B2 | 12/2009 | Louch et al. |
| 7,646,677 | B2 | 1/2010 | Nakamura |
| 7,655,874 | B2 | 2/2010 | Akieda |
| 7,682,070 | B2 | 3/2010 | Burton |
| 7,708,457 | B2 | 5/2010 | Girardin |

(56) References Cited

U.S. PATENT DOCUMENTS 7,710,456 B2 5/2010 Koshiba et al.
7,732,724 B2 6/2010 Otani et al.
7,761,246 B2 7/2010 Matsui
7,763,819 B2 7/2010 Ieda et al.
7,772,507 B2 8/2010 Orr
7,778,115 B2 8/2010 Ruchonnet
7,781,726 B2 8/2010 Matsui et al.
RE41,637 E 9/2010 O'Hara et al.
7,791,587 B2 9/2010 Kosugi
7,791,588 B2 9/2010 Tierling et al.
7,791,597 B2 9/2010 Silverstein et al.
7,822,469 B2 10/2010 Lo
7,856,255 B2 12/2010 Tsuchiya et al.
7,858,583 B2 12/2010 Schmidt et al.
7,865,324 B2 1/2011 Lindberg
7,894,957 B2 2/2011 Carlson
7,920,249 B2 4/2011 Heinks et al.
7,946,758 B2 5/2011 Mooring
8,063,892 B2 11/2011 Shahoian et al.
8,138,488 B2 3/2012 Grot
8,139,035 B2 3/2012 Strawn et al.
8,143,981 B2 3/2012 Washizu et al.
8,167,126 B2 5/2012 Stiehl
8,169,402 B2 5/2012 Shahoian et al.
8,188,989 B2 5/2012 Levin et al.
8,195,313 B1 6/2012 Fadell et al.
8,220,987 B2 7/2012 Kimura et al.
8,229,535 B2 7/2012 Mensinger et al.
8,248,815 B2 8/2012 Yang et al.
8,263,886 B2 9/2012 Lin et al.
8,263,889 B2 9/2012 Takahashi et al.
8,275,327 B2 9/2012 Yi et al.
8,294,670 B2 10/2012 Griffin et al.
8,312,495 B2 11/2012 Vanderhoff
8,318,340 B2 11/2012 Stimits
8,368,677 B2 2/2013 Yamamoto
8,371,745 B2 2/2013 Manni
8,373,661 B2 2/2013 Lan et al.
8,405,618 B2 3/2013 Colgate
8,410,971 B2 4/2013 Friedlander
8,432,368 B2 4/2013 Momeyer et al.
8,439,559 B2 5/2013 Luk et al.
8,441,450 B2 5/2013 Degner et al.
8,446,713 B2 5/2013 Lai
8,456,430 B2 6/2013 Oliver et al.
8,477,118 B2 7/2013 Lan et al.
8,493,190 B2 7/2013 Periquet et al.
8,508,511 B2 8/2013 Tanaka et al.
8,525,777 B2 9/2013 Stavely et al.
8,562,489 B2 10/2013 Burton et al.
8,568,313 B2 10/2013 Sadhu
8,576,044 B2 11/2013 Chapman
8,593,598 B2 11/2013 Chen et al.
8,607,662 B2 12/2013 Huang
8,614,881 B2 12/2013 Yoo
8,624,836 B1 1/2014 Miller et al.
8,666,682 B2 3/2014 LaVigne et al.
8,677,285 B2 3/2014 Tsern et al.
8,704,787 B2 4/2014 Yamamoto
8,711,093 B2 4/2014 Ong et al.
8,717,151 B2 5/2014 Forutanpour et al.
8,724,087 B2 5/2014 Van De Kerkhof et al.
8,730,167 B2 5/2014 Ming et al.
8,735,747 B2 5/2014 Bigand
8,743,088 B2 6/2014 Watanabe
8,783,944 B2 7/2014 Doi
8,797,153 B2 8/2014 Vanhelle et al.
8,804,993 B2 8/2014 Shukla et al.
8,810,514 B2 8/2014 Zhao et al.
8,816,962 B2 8/2014 Obermeyer et al.
8,824,245 B2 9/2014 Lau et al.
8,847,741 B2 9/2014 Birnbaum et al.
8,851,372 B2 10/2014 Zhou
8,859,971 B2 10/2014 Weber
8,860,674 B2 10/2014 Lee et al.
8,863,219 B2 10/2014 Brown et al.
D717,679 S 11/2014 Anderssen
8,878,657 B2 11/2014 Periquet et al.
8,885,856 B2 11/2014 Sacha
8,895,911 B2 11/2014 Takahashi
8,905,631 B2 12/2014 Sakurazawa et al.
8,908,477 B2 12/2014 Peters
8,920,022 B2 12/2014 Ishida et al.
8,922,399 B2 12/2014 Bajaj et al.
8,928,452 B2 1/2015 Kim et al.
8,948,832 B2 2/2015 Hong et al.
8,954,135 B2 2/2015 Yuen et al.
8,975,543 B2 3/2015 Hakemeyer
8,994,827 B2 3/2015 Mistry et al.
9,001,625 B2 4/2015 Essery et al.
9,024,733 B2 5/2015 Wouters
9,028,134 B2 5/2015 Koshoji et al.
9,030,446 B2 5/2015 Mistry et al.
9,034,666 B2 5/2015 Vaganov et al.
9,039,614 B2 5/2015 Yuen et al.
9,041,663 B2 5/2015 Westerman
9,042,971 B2 5/2015 Brumback et al.
9,049,998 B2 6/2015 Brumback et al.
9,052,696 B2 6/2015 Breuillot et al.
9,086,717 B2 7/2015 Meerovitsch
9,086,738 B2 7/2015 Leung et al.
9,091,309 B2 7/2015 Battlogg
9,100,493 B1 8/2015 Zhou
9,101,184 B2 8/2015 Wilson
9,105,413 B2 8/2015 Hiranuma et al.
9,123,483 B2 9/2015 Ferri et al.
9,134,807 B2 9/2015 Shaw et al.
9,141,087 B2 9/2015 Brown et al.
9,176,577 B2 11/2015 Jangaard et al.
9,176,598 B2 11/2015 Sweetser et al.
9,202,372 B2 12/2015 Reams et al.
9,213,409 B2 12/2015 Redelsheimer et al.
9,223,296 B2 12/2015 Yang et al.
9,241,635 B2 1/2016 Yuen et al.
9,244,438 B2 1/2016 Hoover et al.
9,256,209 B2 2/2016 Yang et al.
9,277,156 B2 3/2016 Bennett et al.
9,348,322 B2 5/2016 Fraser et al.
9,350,850 B2 5/2016 Pope et al.
9,367,146 B2 6/2016 Piot
9,386,932 B2 7/2016 Chatterjee et al.
9,426,275 B2 8/2016 Eim et al.
9,430,042 B2 8/2016 Levin
9,437,357 B2 9/2016 Furuki et al.
9,449,770 B2 9/2016 Sanford et al.
9,501,044 B2 11/2016 Jackson et al.
9,520,100 B2 12/2016 Houjou et al.
9,532,723 B2 1/2017 Kim
9,542,016 B2 1/2017 Armstrong-Muntner
9,545,541 B2 1/2017 Aragones et al.
9,552,023 B2 1/2017 Joo et al.
9,599,964 B2 3/2017 Gracia
9,600,071 B2 3/2017 Rothkopf
9,606,721 B2 3/2017 Park et al.
9,607,505 B2 3/2017 Rothkopf et al.
9,620,312 B2 4/2017 Ely et al.
9,627,163 B2 4/2017 Ely
9,632,318 B2 4/2017 Goto et al.
9,632,537 B2 4/2017 Memering
9,638,587 B2 5/2017 Marquas et al.
9,651,922 B2 5/2017 Hysek et al.
9,659,482 B2 5/2017 Yang et al.
9,680,831 B2 6/2017 Jooste et al.
9,709,956 B1 7/2017 Ely et al.
9,753,436 B2 9/2017 Ely et al.
D800,172 S 10/2017 Akana
9,800,717 B2 10/2017 Ma et al.
9,836,025 B2 12/2017 Ely et al.
9,873,711 B2 1/2018 Hoover et al.
9,874,945 B2 1/2018 Fukumoto
9,886,006 B2 2/2018 Ely et al.
9,891,590 B2 2/2018 Shim et al.
9,891,651 B2 2/2018 Jackson et al.
9,891,667 B2 2/2018 Jung et al.

(56) References Cited

U.S. PATENT DOCUMENTS 9,898,032 B2 2/2018 Hafez et al.
9,913,591 B2 3/2018 Lapetina et al.
9,921,548 B2 3/2018 Mitani
9,927,902 B2 3/2018 Burr et al.
9,939,923 B2 4/2018 Sharma
9,946,297 B2 4/2018 Nazzaro et al.
9,952,558 B2 4/2018 Ely
9,952,682 B2 4/2018 Zhang et al.
9,971,305 B2 5/2018 Ely et al.
9,971,405 B2 5/2018 Salo et al.
9,971,407 B2 5/2018 Holenarsipur et al.
9,979,426 B2 5/2018 Na et al.
10,001,817 B2 6/2018 Zambetti et al.
10,012,550 B2 7/2018 Yang
10,018,966 B2 7/2018 Ely et al.
10,019,097 B2 7/2018 Ely et al.
10,037,006 B2 7/2018 Ely
10,037,081 B2 7/2018 Grant
10,048,802 B2 8/2018 Shedletsky
10,057,470 B2 8/2018 Kim et al.
10,061,399 B2 8/2018 Bushnell et al.
10,066,970 B2 9/2018 Gowreesunker et al.
10,092,203 B2 10/2018 Mirov
10,108,016 B2 10/2018 Bosveld
10,114,342 B2 10/2018 Kim et al.
10,145,711 B2 12/2018 Boonsom et al.
10,175,652 B2 1/2019 Ely et al.
10,190,891 B1 1/2019 Rothkopf et al.
10,191,455 B2 1/2019 Shim et al.
10,203,662 B1 2/2019 Lin et al.
10,209,148 B2 2/2019 Lyon et al.
10,216,147 B2 2/2019 Ely et al.
10,222,755 B2 3/2019 Coakley et al.
10,222,756 B2 3/2019 Ely et al.
10,222,909 B2 3/2019 Shedletsky et al.
10,234,828 B2 3/2019 Ely et al.
10,241,593 B2 3/2019 Chen
10,274,905 B2 4/2019 Chung
10,296,125 B2 5/2019 Ely et al.
10,331,081 B2 6/2019 Ely et al.
10,331,082 B2 6/2019 Ely et al.
10,332,111 B2 6/2019 Mokhasi et al.
10,353,487 B2 7/2019 Chung et al.
10,379,629 B2 8/2019 Bushnell et al.
10,386,940 B2 8/2019 Kim
10,401,961 B2 9/2019 Cruz-Hernandez et al.
10,429,959 B2 10/2019 Battlogg
10,444,040 B2 10/2019 Ruh
10,474,194 B1 11/2019 Ell et al.
10,503,258 B2 12/2019 Holenarsipur et al.
10,509,486 B2 12/2019 Bushnell et al.
10,524,671 B2 1/2020 Lamego
10,534,320 B2 1/2020 Ferri et al.
10,534,900 B2 1/2020 Cheong et al.
10,551,798 B1 2/2020 Bushnell et al.
10,572,053 B2 2/2020 Ely et al.
10,579,090 B2 3/2020 Jackson et al.
10,593,617 B2 3/2020 Ashikaga et al.
10,599,101 B2 3/2020 Rothkopf et al.
10,610,157 B2 4/2020 Pandya et al.
10,613,685 B2 4/2020 Shedletsky
10,627,783 B2 4/2020 Rothkopf et al.
10,655,988 B2 5/2020 Boonsom et al.
10,664,074 B2 5/2020 Moussette et al.
10,732,571 B2 8/2020 Ely et al.
10,765,019 B2 9/2020 Werner
10,840,041 B1 11/2020 Harms
10,845,764 B2 11/2020 Ely
10,852,700 B2 12/2020 Abramov
10,852,855 B2 12/2020 Niu
10,871,385 B2 12/2020 Kok
10,884,549 B2 1/2021 Shedletsky et al.
10,936,071 B2 3/2021 Pandya et al.
10,942,491 B2 3/2021 Rothkopf
10,948,880 B2 3/2021 Ely et al.
10,955,937 B2 3/2021 Bushnell et al.
10,962,930 B2 3/2021 Ely et al.
10,962,935 B1 3/2021 Ely et al.
10,987,054 B2 4/2021 Pandya et al.
11,000,193 B2 5/2021 Tal et al.
11,002,572 B2 5/2021 Boonsom et al.
11,029,831 B2 6/2021 Block et al.
11,036,318 B2 6/2021 Bokma et al.
11,085,945 B2 8/2021 Joet
11,148,292 B2 10/2021 Bryner et al.
11,181,863 B2 * 11/2021 Ely ........................ G04G 21/08
11,194,298 B2 12/2021 Roach et al.
11,194,299 B1 12/2021 Taylor et al.
11,209,777 B2 12/2021 Minakuchi et al.
11,221,590 B2 1/2022 Rothkopf et al.
11,347,189 B1 5/2022 Herrera et al.
11,347,351 B2 5/2022 Shedletsky et al.
11,350,869 B2 6/2022 Rasmussen et al.
11,360,440 B2 6/2022 Perkins et al.
11,385,599 B2 7/2022 Ely et al.
11,474,483 B2 10/2022 Rothkopf
11,513,613 B2 11/2022 Bushnell et al.
11,531,306 B2 12/2022 Ely et al.
11,537,082 B2 12/2022 Ferri et al.
11,556,095 B2 1/2023 Hiemstra et al.
11,567,457 B2 1/2023 Rothkopf et al.
11,669,205 B2 6/2023 Shedletsky et al.
11,720,064 B2 8/2023 Ely
11,796,961 B2 * 10/2023 Ely ...................... G04G 17/045
11,796,968 B2 * 10/2023 Roach ...................... G01D 5/30
11,815,860 B2 11/2023 Pandya et al.
11,860,587 B2 1/2024 Taylor et al.
12,045,416 B2 7/2024 Shedletsky et al.
12,092,996 B2 9/2024 Herrera et al.
12,181,840 B2 12/2024 Ely et al.
12,276,943 B2 4/2025 Ely et al.
2002/0101457 A1 8/2002 Lang
2003/0174590 A1 9/2003 Arikawa et al.
2004/0047244 A1 3/2004 Iino et al.
2004/0082414 A1 4/2004 Knox
2004/0130971 A1 7/2004 Ecoffet et al.
2004/0264301 A1 12/2004 Howard et al.
2005/0075558 A1 4/2005 Vecerina et al.
2005/0088417 A1 4/2005 Mulligan
2006/0002653 A1 1/2006 Grunnet-Jepsen et al.
2006/0250377 A1 11/2006 Zadesky et al.
2007/0013775 A1 1/2007 Shin
2007/0050054 A1 3/2007 Sambandam Guruparan et al.
2007/0182708 A1 8/2007 Poupyrev et al.
2007/0211042 A1 9/2007 Kim et al.
2007/0222756 A1 9/2007 Wu et al.
2007/0229671 A1 10/2007 Takeshita et al.
2007/0242569 A1 10/2007 Inoue et al.
2007/0247421 A1 10/2007 Orsley et al.
2008/0130914 A1 6/2008 Cho
2009/0051649 A1 2/2009 Rondel
2009/0073119 A1 3/2009 Le et al.
2009/0122656 A1 5/2009 Bonnet et al.
2009/0146975 A1 6/2009 Chang
2009/0152452 A1 6/2009 Lee et al.
2009/0217207 A1 8/2009 Kagermeier et al.
2009/0285443 A1 11/2009 Camp et al.
2009/0312051 A1 12/2009 Hansson et al.
2009/0312655 A1 12/2009 Lo
2010/0033430 A1 2/2010 Kakutani et al.
2010/0053468 A1 3/2010 Havrill
2010/0081375 A1 4/2010 Rosenblatt et al.
2010/0149099 A1 6/2010 Elias
2011/0007468 A1 1/2011 Burton et al.
2011/0090148 A1 4/2011 Li et al.
2011/0158057 A1 6/2011 Brewer et al.
2011/0242064 A1 10/2011 Ono et al.
2011/0270358 A1 11/2011 Davis et al.
2012/0067711 A1 3/2012 Yang
2012/0068857 A1 3/2012 Rothkopf et al.
2012/0075082 A1 3/2012 Rothkopf et al.
2012/0112859 A1 5/2012 Park et al.
2012/0113044 A1 5/2012 Strazisar et al.
2012/0206248 A1 8/2012 Biggs

(56) References Cited

U.S. PATENT DOCUMENTS

| | | | |
|---|---|---|---|
| 2012/0272784 | A1 | 11/2012 | Bailey et al. |
| 2013/0037396 | A1 | 2/2013 | Yu |
| 2013/0087443 | A1 | 4/2013 | Kikuchi |
| 2013/0191220 | A1 | 7/2013 | Dent et al. |
| 2013/0235704 | A1 | 9/2013 | Grinberg |
| 2013/0261405 | A1 | 10/2013 | Lee et al. |
| 2013/0335196 | A1 | 12/2013 | Zhang et al. |
| 2014/0009397 | A1 | 1/2014 | Gillespie |
| 2014/0045547 | A1 | 2/2014 | Singamsetty et al. |
| 2014/0071098 | A1 | 3/2014 | You |
| 2014/0073486 | A1 | 3/2014 | Ahmed et al. |
| 2014/0132516 | A1 | 5/2014 | Tsai et al. |
| 2014/0143784 | A1 | 5/2014 | Mistry et al. |
| 2014/0197936 | A1 | 7/2014 | Biggs et al. |
| 2014/0368442 | A1 | 12/2014 | Vahtola |
| 2014/0375579 | A1 | 12/2014 | Fujiwara |
| 2015/0049059 | A1 | 2/2015 | Zadesky et al. |
| 2015/0098309 | A1 | 4/2015 | Adams et al. |
| 2015/0124415 | A1 | 5/2015 | Goyal et al. |
| 2015/0186609 | A1 | 7/2015 | Utter, II |
| 2015/0293592 | A1 | 10/2015 | Cheong |
| 2015/0320346 | A1 | 11/2015 | Chen |
| 2015/0341031 | A1 | 11/2015 | Marquas et al. |
| 2015/0366098 | A1 | 12/2015 | Lapetina et al. |
| 2016/0018846 | A1 | 1/2016 | Zenoff |
| 2016/0147432 | A1 | 5/2016 | Shi et al. |
| 2016/0170624 | A1 | 6/2016 | Zambetti et al. |
| 2016/0203710 | A1 | 7/2016 | Bataillou et al. |
| 2016/0241688 | A1 | 8/2016 | Vossoughi |
| 2016/0320583 | A1 | 11/2016 | Hall, Jr. |
| 2016/0327911 | A1 | 11/2016 | Eim et al. |
| 2016/0338642 | A1 | 11/2016 | Parara et al. |
| 2017/0027461 | A1 | 2/2017 | Shin et al. |
| 2017/0031449 | A1 | 2/2017 | Karsten et al. |
| 2017/0069443 | A1 | 3/2017 | Wang et al. |
| 2017/0069444 | A1 | 3/2017 | Wang et al. |
| 2017/0216519 | A1 | 8/2017 | Vouillamoz |
| 2017/0216668 | A1 | 8/2017 | Burton et al. |
| 2017/0319082 | A1 | 11/2017 | Sayme |
| 2018/0059624 | A1 | 3/2018 | James |
| 2018/0225701 | A1 | 8/2018 | Han |
| 2018/0235491 | A1 | 8/2018 | Bayley et al. |
| 2019/0025940 | A1 | 1/2019 | Shim et al. |
| 2019/0056700 | A1 | 2/2019 | Matsuno |
| 2019/0072911 | A1 | 3/2019 | Ely et al. |
| 2019/0317454 | A1 | 10/2019 | Holenarsipur et al. |
| 2020/0041962 | A1 | 2/2020 | Beyhs |
| 2020/0064779 | A1 | 2/2020 | Pandya et al. |
| 2020/0085331 | A1 | 3/2020 | Chou |
| 2020/0159172 | A1 | 5/2020 | Bushnell et al. |
| 2021/0055696 | A1 | 2/2021 | Ely |
| 2021/0181682 | A1 | 6/2021 | Ely et al. |
| 2021/0181691 | A1 | 6/2021 | Rothkopf et al. |
| 2021/0181692 | A1 | 6/2021 | Rothkopf et al. |
| 2021/0255590 | A1 | 8/2021 | Ely et al. |
| 2021/0303081 | A1 | 9/2021 | Kuboyama et al. |
| 2021/0325168 | A1 | 10/2021 | Lv et al. |
| 2021/0353226 | A1 | 11/2021 | Hiemstra et al. |
| 2021/0373501 | A1 | 12/2021 | Pandya et al. |
| 2021/0405594 | A1 | 12/2021 | Holenarsipur et al. |
| 2022/0043397 | A1 | 2/2022 | Ely et al. |
| 2022/0043402 | A1 | 2/2022 | Roach et al. |
| 2022/0074731 | A1 | 3/2022 | Jang et al. |
| 2022/0075328 | A1 | 3/2022 | Taylor |
| 2022/0261111 | A1 | 8/2022 | Shedletsky et al. |
| 2022/0299944 | A1 | 9/2022 | Ely |
| 2022/0326660 | A1 | 10/2022 | Perkins |
| 2022/0413446 | A1 | 12/2022 | Rothkopf |
| 2023/0012897 | A1 | 1/2023 | Bushnell et al. |
| 2023/0028554 | A1 | 1/2023 | Rothkopf et al. |
| 2023/0161299 | A1 | 5/2023 | Beyhs |
| 2023/0168635 | A1 | 6/2023 | Hiemstra et al. |
| 2023/0213893 | A1 | 7/2023 | Rothkopf et al. |
| 2023/0259235 | A1 | 8/2023 | Shedletsky et al. |
| 2023/0341819 | A1 | 10/2023 | Ely et al. |
| 2023/0400818 | A1 | 12/2023 | Davis et al. |
| 2023/0408984 | A1 | 12/2023 | Liang et al. |
| 2023/0418230 | A1 | 12/2023 | Ely et al. |
| 2024/0036523 | A1 | 2/2024 | Pandya et al. |
| 2024/0045383 | A1 | 2/2024 | Roach et al. |
| 2024/0126219 | A1 | 4/2024 | Taylor et al. |
| 2024/0152100 | A1 | 5/2024 | Beyhs |
| 2024/0192804 | A1 | 6/2024 | Shedletsky et al. |
| 2024/0264568 | A1 | 8/2024 | Ely |
| 2024/0393747 | A1 | 11/2024 | Ely et al. |
| 2025/0004426 | A1 | 1/2025 | Herrera et al. |
| 2025/0013202 | A1 | 1/2025 | Ely et al. |
| 2025/0013207 | A1 | 1/2025 | Perkins et al. |
| 2025/0093818 | A1 | 3/2025 | Ely et al. |
| 2025/0103008 | A1 | 3/2025 | Pandya et al. |
| 2025/0109970 | A1 | 4/2025 | Chamakura et al. |
| 2025/0110580 | A1 | 4/2025 | Zhao et al. |
| 2025/0165101 | A1 | 5/2025 | Shedletsky et al. |
| 2025/0189933 | A1 | 6/2025 | Pandya et al. |
| 2025/0231532 | A1 | 7/2025 | Beyhs |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102543534 | 7/2012 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |

(56) References Cited

FOREIGN PATENT DOCUMENTS

| | | | |
|---|---|---|---|
| CN | 205645648 | | 10/2016 |
| CN | 205721636 | | 11/2016 |
| CN | 205750744 | | 11/2016 |
| CN | 106236051 | | 12/2016 |
| CN | 106557218 | | 4/2017 |
| CN | 206147524 | | 5/2017 |
| CN | 206209589 | | 5/2017 |
| CN | 107111342 | | 8/2017 |
| CN | 107122088 | | 9/2017 |
| CN | 107966895 | | 4/2018 |
| CN | 109144173 | A | 1/2019 |
| CN | 109389816 | A | 2/2019 |
| CN | 209560397 | | 10/2019 |
| CN | 209625187 | | 11/2019 |
| CN | 111752138 | | 10/2020 |
| CN | 215494568 | | 1/2022 |
| CN | 114220694 | | 3/2022 |
| CN | 114220694 | A | 3/2022 |
| CN | 106125968 | | 11/2022 |
| CN | 218675709 | | 3/2023 |
| DE | 2352016 | | 4/1975 |
| DE | 3706194 | | 9/1988 |
| DE | 102008023651 | | 11/2009 |
| DE | 102016215087 | | 3/2017 |
| EP | 0165548 | | 12/1985 |
| EP | 0556155 | | 8/1993 |
| EP | 1345095 | | 9/2003 |
| EP | 1519452 | | 3/2005 |
| EP | 1669724 | | 6/2006 |
| EP | 1832969 | | 9/2007 |
| EP | 2375295 | | 10/2011 |
| EP | 2579186 | | 4/2013 |
| EP | 2720129 | | 4/2014 |
| EP | 2884239 | | 6/2015 |
| FR | 2030093 | | 10/1970 |
| FR | 2801402 | | 5/2001 |
| GB | 887369 | | 1/1962 |
| GB | 2433211 | | 6/2007 |
| JP | S52151058 | | 12/1977 |
| JP | S52164551 | | 12/1977 |
| JP | S53093067 | | 8/1978 |
| JP | S5478178 | | 6/1979 |
| JP | S54087779 | | 6/1979 |
| JP | S5708582 | | 1/1982 |
| JP | S5734457 | | 2/1982 |
| JP | S60103936 | | 6/1985 |
| JP | S60103937 | | 6/1985 |
| JP | H02285214 | | 11/1990 |
| JP | H04093719 | | 3/1992 |
| JP | H04157319 | | 5/1992 |
| JP | H05087955 | | 4/1993 |
| JP | H05203465 | | 8/1993 |
| JP | H05312595 | | 11/1993 |
| JP | H06050927 | | 12/1994 |
| JP | H06331761 | | 12/1994 |
| JP | H06347293 | | 12/1994 |
| JP | H07116141 | | 5/1995 |
| JP | H08211169 | | 8/1996 |
| JP | H0914941 | | 1/1997 |
| JP | H10161811 | | 6/1998 |
| JP | H11121210 | | 4/1999 |
| JP | H11191508 | | 7/1999 |
| JP | 2000258559 | | 9/2000 |
| JP | 2000316824 | | 11/2000 |
| JP | 2000337892 | | 12/2000 |
| JP | 2001084934 | | 3/2001 |
| JP | 2001167651 | | 6/2001 |
| JP | 2001202178 | | 7/2001 |
| JP | 2001215288 | | 8/2001 |
| JP | 2001289977 | | 10/2001 |
| JP | 2001524206 | | 11/2001 |
| JP | 2002071480 | | 3/2002 |
| JP | 2002165768 | | 6/2002 |
| JP | 2003036144 | | 2/2003 |
| JP | 2003050668 | | 2/2003 |
| JP | 2003151410 | | 5/2003 |
| JP | 2003215271 | | 7/2003 |
| JP | 2003331693 | | 11/2003 |
| JP | 2004079410 | | 3/2004 |
| JP | 2004184396 | | 7/2004 |
| JP | 2004028979 | | 11/2004 |
| JP | 2005017011 | | 1/2005 |
| JP | 2005063200 | | 3/2005 |
| JP | 2005099023 | | 4/2005 |
| JP | 2005108630 | | 4/2005 |
| JP | 2006101505 | | 4/2006 |
| JP | 2006164275 | | 6/2006 |
| JP | 3852854 | | 12/2006 |
| JP | 2007101380 | | 4/2007 |
| JP | 2007149620 | | 6/2007 |
| JP | 2007248176 | | 9/2007 |
| JP | 2007285748 | | 11/2007 |
| JP | 2007311153 | | 11/2007 |
| JP | 2008053980 | | 3/2008 |
| JP | 2008122124 | | 5/2008 |
| JP | 2008122377 | | 5/2008 |
| JP | 2008170436 | | 7/2008 |
| JP | 2008235226 | | 10/2008 |
| JP | 2009009382 | | 1/2009 |
| JP | 2009070657 | | 4/2009 |
| JP | 2009519737 | | 5/2009 |
| JP | 2009540399 | | 11/2009 |
| JP | 2010032545 | | 2/2010 |
| JP | 2010515153 | | 5/2010 |
| JP | 2010165001 | | 7/2010 |
| JP | 2010186572 | | 8/2010 |
| JP | 2010243344 | | 10/2010 |
| JP | 2010244797 | | 10/2010 |
| JP | 2011021929 | | 2/2011 |
| JP | 2011165468 | | 8/2011 |
| JP | 2011221659 | | 11/2011 |
| JP | 2012053801 | | 3/2012 |
| JP | 2012221905 | | 11/2012 |
| JP | 2013057516 | | 3/2013 |
| JP | 2013079961 | | 5/2013 |
| JP | 2013524189 | | 6/2013 |
| JP | 3190075 | | 4/2014 |
| JP | 5477393 | | 4/2014 |
| JP | 2014512556 | | 5/2014 |
| JP | 2014112222 | | 6/2014 |
| JP | 2014174031 | | 9/2014 |
| JP | 2016532266 | | 10/2016 |
| JP | 2018510451 | | 4/2018 |
| KR | 20010030477 | | 4/2001 |
| KR | 200278568 | | 3/2002 |
| KR | 20030083340 | | 10/2003 |
| KR | 20070011685 | | 1/2007 |
| KR | 20070014247 | | 2/2007 |
| KR | 100754674 | | 9/2007 |
| KR | 20080028935 | | 4/2008 |
| KR | 20080045397 | | 5/2008 |
| KR | 100849684 | | 8/2008 |
| KR | 1020080111563 | | 12/2008 |
| KR | 2020100007563 | | 7/2010 |
| KR | 20110011393 | | 2/2011 |
| KR | 20110012784 | | 2/2011 |
| KR | 20110103761 | | 9/2011 |
| KR | 20110113368 | | 10/2011 |
| KR | 20130036038 | | 4/2013 |
| KR | 20130131873 | | 12/2013 |
| KR | 20140051391 | | 4/2014 |
| KR | 20140064689 | | 5/2014 |
| KR | 20140104388 | | 8/2014 |
| KR | 20160017070 | | 2/2016 |
| KR | 20160048967 | | 5/2016 |
| KR | 20170106395 | | 9/2017 |
| KR | 20170127744 | A | 11/2017 |
| KR | 102136836 | | 7/2020 |
| NL | 1040225 | | 11/2014 |
| RO | 129033 | | 11/2013 |
| TW | 200633681 | | 10/2006 |
| WO | WO2001/022038 | | 3/2001 |
| WO | WO2001/069567 | | 9/2001 |
| WO | WO2003/032538 | | 4/2003 |

(56) References Cited

FOREIGN PATENT DOCUMENTS

| | | |
|---|---|---|
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO2015/116111 | 8/2015 |
| WO | WO2015122885 | 8/2015 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |
| WO | WO2016208835 | 12/2016 |
| WO | WO2017/013278 | 1/2017 |
| WO | WO2019/050778 | 3/2019 |
| WO | WO 2020173085 | 9/2020 |

OTHER PUBLICATIONS

U.S. Appl. No. 17/840,222, filed Jun. 14, 2022; pending.
U.S. Appl. No. 17/951,020, filed Sep. 22, 2022; pending.
U.S. Appl. No. 17/951,973, filed Sep. 23, 2022; pending.
U.S. Appl. No. 17/989,057, filed Nov. 17, 2022; pending.
U.S. Appl. No. 18/074,358, filed Dec. 2, 2022; pending.
U.S. Appl. No. 18/075,253, filed Dec. 5, 2022; pending.
Author Unknown, “Desirable Android Wear smartwatch from LG,” Gulf News, Dubai, 3 pages, Jan. 30, 2015.
Author Unknown, “Fossil Q ups smartwatch game with handsome design and build,” Business Mirror, Makati City, Philippines, 3 pages, Dec. 20, 2016.
Author Unknown, “How Vesag Helps Kids Women and Visitors,” http://www.sooperarticles.com/health-fitness-articles/children-health-articles/how-vesag-helps-kids-women-visitors-218542.html, 2 pages, at least as early as May 20, 2015.
Author Unknown, “mHealth,” http://mhealth.vesag.com/?m=201012, 7 pages, Dec. 23, 2010.
Author Unknown, “mHealth Summit 2010,” http://www.virtualpressoffice.com/eventsSubmenu.do?page=exhibitorPage&showId=1551&companyId=5394, 5 pages, Nov. 18, 2010.
Author Unknown, “MyKronoz ZeTime: World’s Most Funded Hybrid Smartwatch Raised over $3M on Kickstarter, Running until April 27th,” Business Wire, New York, New York, 3 pages, Apr. 21, 2017.
Author Unknown, “RedEye mini Plug-in Universal Remote Adapter for iPhone, iPod touch and iPad,” Amazon.com, 4 pages, date unknown.
Author Unknown, “Re iPhone Universal Remote Control—Infrared Remote Control Accessory for iphone and ipod touch,” http://www.amazon.com/iPhone-Universal-Remote-Control-Accessory/dp/tech-data/B0038Z4 . . . , 2 pages, at least as early as Jul. 15, 2010.
Author Unknown, “Vesag Wrist Watch for Dementia Care from VYZIN,” http://vyasa-kaaranam-ketkadey.blogspot.com/2011/03/vesag-wrist-watch-for-dementia-care.html, 2 pages, Mar. 31, 2011.
Author Unknown, “Vyzin Electronics Private Limited launches Vesag Watch,” http://www.virtualpressoffice.com/showJointPage.do?page=jp&showId=1544, 5 pages, Jan. 6, 2011.
Author Unknown, “Vyzin Unveiled Personal Emergency Response System (PERS) with Remote Health Monitoring That Can Be Used for Entire Family,” http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, “DeskThorityNet, Optical Switch Keyboards,” http://deskthority.net/keyboards-f2/optical-switch-keyboards-t1474.html, 22 pages, Jul. 11, 2015.
Epstein et al., “Economical, High-Performance Optical Encoders,” Hewlett-Packard Journal, pp. 99-106, Oct. 1988. [text only version].
GreyB, “Google Watch: Convert your arm into a keyboard,” http://www.whatafuture.com/2014/02/28/google-smartwatch/#sthash.Yk35cDXK.dpbs, 3 pages, Feb. 28, 2014.
IBM, “Additional Functionality Added to Cell Phone via “Learning” Function Button,” www.ip.com, 2 pages, Feb. 21, 2007.
Kim, Joseph, “2010 mHealth Summit Emerges as Major One-Stop U.S. Venue for Mobile Health,” http://www.medicineandtechnology.com/2010/08/2010-mhealth-summit-emerges-as-major.html, 3 pages, Aug. 26, 2010.
Krishnan et al., “A Miniature Surface Mount Reflective Optical Shaft Encoder,” Hewlett-Packard Journal, Article 8, pp. 1-6, Dec. 1996.
Narayanaswami et al., “Challenges and considerations for the design and production of a purpose-optimized body-worn wrist-watch computer,” Defense, Security, and Cockpit Displays, 2004.
M.T. Raghunath et al., User Interfaces for Applications on a Wrist Watch, Personal and Ubiquitous Computing, vol. 6, No. 1, 2002, Springer.
Rick, “How VESAG Helps Health Conscious Citizens,” http://sensetekgroup.com/2010/11/29/wireless-health-monitoring-system/, 2 pages, Nov. 29, 2010.
Sadhu, Rajendra, “How VESAG Helps People Who Want to ‘Be There’?,” http://ezinearticles.com/?How-Vesag-Helps-People-Who-Want-to-Be-There?&id-5423873, 1 page, Nov. 22, 2010.
Sadhu, Rajendra, “Mobile Innovation Helps Dementia and Alzheimer’s Patients,” http://www.itnewsafrica.com/2010/11/mobile-innovation-helps-dementia-andalzheimer%E2%80%99s-patients/, 3 pages, Nov. 22, 2010.
Sherr, Sol, “Input Devices,” p. 55, Mar. 1988.
Tran et al., “Universal Programmable Remote Control/Telephone,” www.ip.com, 2 pages, May 1, 1992.

* cited by examiner

CROWN FOR AN ELECTRONIC WATCH

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch may include a housing defining a side wall, a display, a front cover positioned over the display, and an input system configured to receive a rotational input and a translational input. The input system may include a switch element positioned within the housing and defining a first opening along a top of the switch element, a crown including a knob external to the housing, and a shaft assembly coupled to the knob and extending through a second opening in the side wall of the housing and through the first opening in the switch element, the shaft assembly defining an actuation feature configured to actuate the switch element in response to the translational input, and a rotation sensing system configured to detect the rotational input.

The rotation sensing system may be an optical rotation sensing system configured to detect the rotational input based at least in part on light reflected from a surface of the crown, the knob may define a conductive surface, and the electronic watch may further include a battery within the housing. The electronic watch may further include a processing system operatively coupled to the battery, the switch element, and the optical rotation sensing system and configured to change a graphical output of the display in response to at least one of the translational input or the rotational input, and the processing system may be conductively coupled to the conductive surface through the shaft assembly and may be configured to determine a biological parameter of a user based at least in part on a voltage detected at the conductive surface.

The electronic watch may further include a bracket assembly within the housing and defining a third opening, the switch element may be coupled to the bracket assembly, and a portion of the crown extends into the third opening. The bracket assembly may include a bushing positioned in the third opening, and the bushing rotationally supports an end of the shaft assembly.

The shaft assembly may define a barrel portion having a first diameter and an end portion extending from the barrel portion and having a second diameter less than the first diameter, and the barrel portion may define the actuation feature of the shaft assembly. The electronic watch may further include a bracket assembly within the housing and defining a third opening, the switch element may be coupled to the bracket assembly, a bushing may be positioned in the third opening and may define a fourth opening, and the end portion of the shaft assembly may extend into the fourth opening of the bushing and may be rotationally supported by the bushing.

The rotation sensing system may be configured to direct a laser beam onto a surface of the crown and receive a reflected portion of the laser beam, and the rotation sensing system may determine a speed and a direction of the rotational input using self-mixing laser interferometry.

A wearable electronic device may include a housing having a side wall and a first opening in the side wall, a display, and an input system including a crown configured to receive a rotational input and a translational input. The crown may include a knob positioned along a side of the housing and a shaft assembly coupled to the knob and extending through the first opening in the side wall. The wearable electronic device may further include a bracket assembly within the housing and including a rotational support for the crown, a switch element coupled to the bracket assembly and defining a second opening through which a portion of the shaft assembly extends, the switch element configured to be actuated by the crown in response to the translational input, a rotation sensing system configured to detect the rotational input, and a processing system operably coupled to the switch element, the rotation sensing system, and the display and configured to change a graphical output of the display in response to at least one of the translational input or the rotational input. The rotational support may be a first rotational support, and the wearable electronic device may further include a collar coupled to the housing and defining a second rotational support for the crown.

The rotational support may include a polymer bushing configured to contact a rotating surface of the shaft assembly. The bracket assembly may define a third opening, the polymer bushing may be positioned in the third opening in the bracket assembly and may define a fourth opening, and an end of the shaft assembly may be positioned in the fourth opening of the polymer bushing.

The crown may define a conductive surface along an exterior structure of the crown, the conductive surface may be conductively coupled to the processing system through the shaft assembly, and the processing system may be configured to determine a biological parameter of a user based at least in part on a voltage detected at the conductive surface. The crown may be conductively isolated from the switch element. The wearable electronic device may further include a friction guard positioned between the switch element and a surface of the shaft assembly and configured to conductively isolate the shaft assembly from the switch element.

An electronic watch may include a housing, a band attached to the housing, a touch-sensitive display, and an input system coupled to the housing and including a crown configured to rotate and translate relative to the housing. The crown may include a shaft assembly extending through an opening in the housing and defining an actuation feature, and a knob coupled to a first end of the shaft assembly and positioned outside of the housing. The input system may further include a bracket assembly within the housing and configured to rotationally support a second end of the shaft assembly opposite the first end of the shaft assembly, a switch element positioned around the shaft assembly and between the knob and the bracket assembly, the switch element configured to be actuated by the actuation feature of the shaft assembly when the crown is translated, and a rotation sensing system configured to detect a rotation of the crown. The crown may be conductively isolated from the switch element. The opening may be a first opening, the switch element may define a second opening, and the shaft assembly may extend through the second opening.

The rotation sensing system may include an optical sensing element configured to detect the rotation of the crown based at least in part on light reflected from a reflecting surface of the shaft assembly. The reflecting surface of the shaft assembly may be between the bracket assembly and the switch element. The reflecting surface of the shaft assembly may be between the switch element and the knob.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
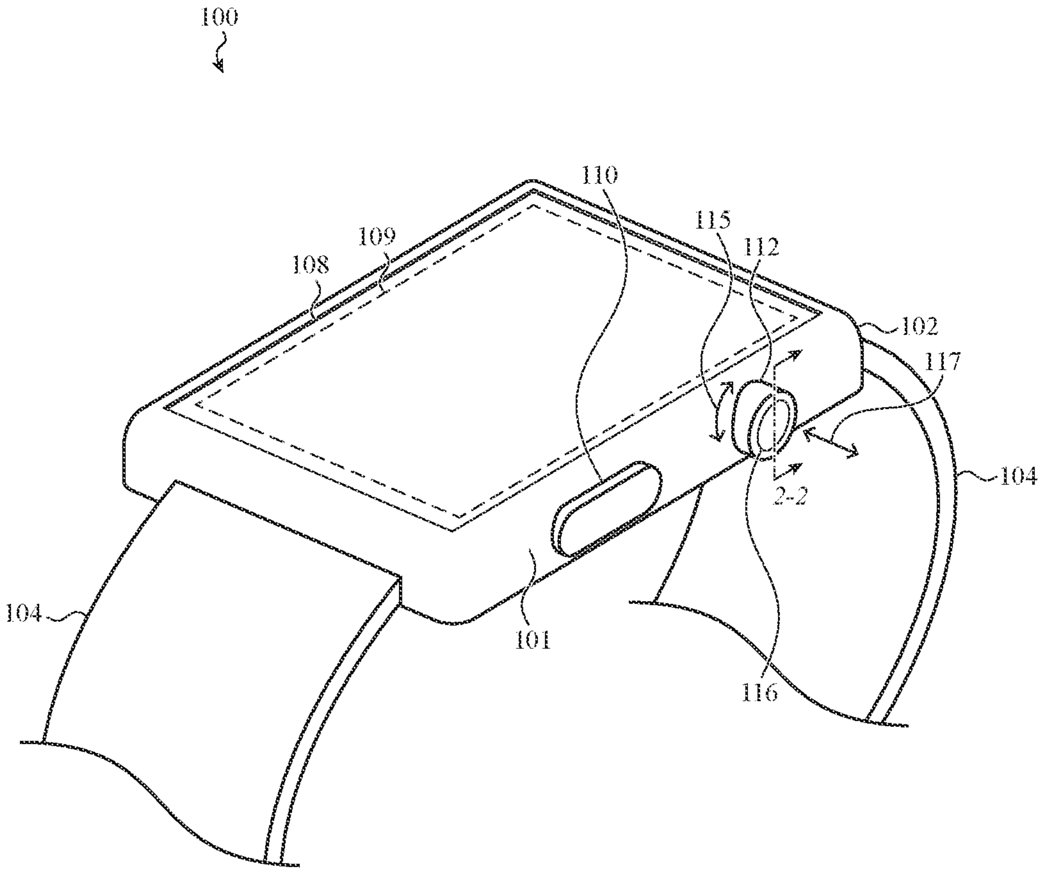
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a "smart watch" or simply a "watch"), and more particularly to a crown that can be manipulated by a user to provide inputs to the device. For example, the crown may accept rotational inputs, by which a user spins, twists, turns, or otherwise rotates the crown about a rotation axis. Rotational inputs may be used to control operations of the device. For example, a rotational input may modify a graphical display of the device in accordance with a direction of rotation of the crown, such as to scroll through lists, select or move graphical objects, move a cursor among objects on a display, or the like. The crown may also accept translational inputs, by which a user pushes or presses on the end of the crown (e.g., along, or parallel to, the rotation axis). Translational inputs may be used to indicate a selection of an item displayed on a display, change a display mode (e.g., to activate a display), change between or among graphical interface modes, or the like. In some cases, a crown may also act as a contact point for a sensor, such as a biometric sensor, of the device. For example, a smart watch may include any or all of a heart rate sensor, an electrocardiograph sensor, a thermometer, a photoplethysmograph sensor, a fingerprint sensor, or the like, all of which are examples of biometric sensors that measure or detect some aspect of a user's body. Such sensors may require direct contact with the user's body, such as via a finger. Accordingly, the crown may include an external component, such as a window, electrode, or the like, that a user may touch in order to allow the biometric sensor to take a reading or measurement. In some cases, electrical signals may be transmitted through the crown to internal sensors via a conductive path defined by and/or through the crown.

In order to provide rotation and translation sensing, crowns may include various sensing systems, which may be positioned inside the watch. For example, an optical sensing system within a watch may detect rotational inputs, and a switch (e.g., a tactile switch, dome switch, etc.) or a force sensing system within the watch may detect translational inputs. In electronic watches that provide many sophisticated electronic systems, such as wireless communications systems, touch-screen displays, GPS receivers, and the like, internal volume is at a premium. Accordingly, reducing the space occupied by the crown sensing systems and other crown-based components can result in greater space for other components (including, for example, a larger battery to provide longer battery life). However, simply reducing the size of the crown components could reduce the overall crown performance (e.g., introduce wobbling and/or misalignment).

Described herein are crowns that have compact designs while maintaining a high degree of crown performance. For example, crowns may include brackets that support the distal or free end of the crown shaft within the device, such that the distance between the rotational support surfaces on the rotating part of the crown may be maximized for a given crown design, thereby providing a high degree of alignment and stability, while also allowing the overall length of the crown to be reduced. In some cases, components that previously were positioned past an end of a crown shaft, such as dome switches, are positioned along the length of the shaft instead, thereby further reducing the overall length of the crown assembly. For example, crowns as described herein may include dome switches that have holes, such that the crown shaft can pass through the dome, while a feature on the shaft actuates the dome switch. In such cases, the translation sensing components may be positioned along the length of the shaft, rather than past the end of the shaft, thereby facilitating a shorter overall length of the crown assembly, and providing more space inside the watch for other components.

In some cases, switch elements (e.g., dome switches, tactile switches, or other switch components) may be positioned along a side of a crown shaft, rather than at an end of the shaft. In such cases, crown translation sensing may be provided without positioning switches and other associated structures at the end of the shaft. Also described herein are crowns that use more compact sensing systems to detect translation and/or rotation of the crown.

FIG. 1A depicts an electronic device 100 (also referred to herein simply as a device 100). The device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, headphones, earbuds, digital media players (e.g., mp3 players), or the like.

The device 100 includes a housing 102 and a band 104 coupled to the housing. The housing 102 may at least partially define an internal volume in which components of the device 100 may be positioned. The housing 102 may also define one or more exterior surfaces of the device, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may attach the device 100 to a user, such as to the user's arm or wrist. The device 100 may include battery charging components within the device 100, which may receive power, charge a battery of the device 100, and/or provide direct power to operate the device 100 regardless of the battery's state of charge (e.g., bypassing the battery of the device 100). The device 100 may include a magnet, such as a permanent magnet, that magnetically couples to a magnet (e.g., a permanent magnet, electromagnet) or magnetic material (e.g., a ferromagnetic material such as iron, steel, or the like) in a charging dock (e.g., to facilitate wireless charging of the device 100).

The device 100 also includes a transparent cover 108 coupled to the housing 102. The cover 108 may define a front face of the device 100. For example, in some cases, the cover 108 (e.g., a front cover) defines substantially the entire front face and/or front surface of the device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), an organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 13.

The device 100 also includes an input system 112 having a knob, external portion, or component(s) or feature(s) positioned along a side wall 101 of the housing 102. The input system 112 may also be referred to as a crown 112. At least a portion of the crown 112 (e.g., a knob 208, FIG. 2) may protrude from and/or be generally external to the housing 102 and may define a generally circular shape or a circular exterior surface. The exterior surface of the crown 112 (or a portion thereof) may be textured, knurled, grooved, or may otherwise have features that may improve the tactile feel of the crown 112. At least a portion of the exterior surface of the crown 112 may also be conductively coupled to biometric sensing circuitry (or circuitry of another sensor that uses a conductive path to an exterior surface), as described herein.

The crown 112 may facilitate a variety of potential user interactions. For example, the crown 112 may be rotated by a user (e.g., the crown may receive rotational inputs). The arrow 115 in FIG. 1A illustrates example direction(s) of rotational inputs to the crown 112. Rotational inputs to the crown 112 may zoom, scroll, rotate, or otherwise manipulate a user interface or other object displayed on the display 109 (among other possible functions). The crown 112 may also be translated or pressed (e.g., axially) by the user, as indicated by arrow 117. Translational or axial inputs may select highlighted objects or icons, cause a user interface to return to a previous menu or display, or activate or deactivate functions (among other possible functions). As described herein, rotational inputs may be sensed using an optical sensing system that uses light reflected by a rotating surface of the crown 112 to determine characteristics (e.g., the speed and/or direction) of the rotational inputs. For example, light may be directed onto a rotating surface of the crown 112, and at least a portion of that light may be reflected by the rotating surface and detected by the sensing system. The sensing system may use the reflected light to determine characteristics of the rotational inputs. In some cases, the sensing system may use self-mixing laser interferometry to determine characteristics of the rotational inputs. In such cases, interference (or other interaction) between a laser beam that is directed onto a rotating surface and the laser light that is reflected from the rotating surface back into the laser source may be used to determine the characteristics. Other types of optical sensing systems may be used instead of or in addition to self-mixing laser interferometry. For example, an image sensor may be used to detect characteristics of the rotational inputs by analyzing images of the rotating surface. As another example, an optical sensing system may include a light emitter that emits light onto a rotating surface (which may have markings, grooves, features, patterns, etc.), and a light detector that detects a portion of the emitted light that is reflected by the rotating surface. The detector may determine parameters or characteristics of the rotation (e.g., speed and direction) based on properties or parameters of the reflected light.

The crown 112 may also include or define an input feature 116 that facilitates input to biometric sensing circuitry or other sensing circuitry within the device 100. The input feature 116 may be a conductive surface that is conductively coupled, via one or more components of the device 100, to the biometric sensing circuitry. The input feature 116 may be a conductive member (e.g., a cap or disk) that is part of the crown 112. In some cases, the input feature 116 and/or the component(s) that define the input feature 116 are electrically isolated from other components of the device 100. For example, the input feature 116 may be electrically isolated from the housing 102. In this way, the conductive path from the input feature 116 to the biometric sensing circuitry may be isolated from other components that may otherwise reduce the effectiveness of the biometric sensor. In order to provide an input to the biometric sensor, a user may place a finger or other body part on the input feature 116. The biometric sensor may be configured to take a reading or measurement in response to detecting that the user has placed a finger or other body part on the input feature 116. In some cases, the biometric sensor may only take a reading or measurement when a sensing function is separately initiated by a user (e.g., by activating the function via a graphical user interface). In other cases, a reading or measurement is taken any time the user contacts the input feature 116 (e.g., to provide a rotational or translational input to the crown 112). The user may have full control over when the biometric sensor takes measurements or readings and may even have the option to turn off the biometric sensing functionality entirely.

The device 100 may also include one or more haptic actuators that are configured to produce a tactile output through the crown 112 or otherwise detectable when using the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like. In some cases, haptic outputs from a haptic actuator may be used to provide tactile outputs when a crown that does not otherwise include a tactile element (e.g., a tactile switch) is actuated. For example, when a translational or axial force is applied to a crown that does not include a tactile switch (or other mechanical tactile component), a haptic actuator may produce a haptic output when the crown is actuated. The device may determine that the crown is actuated when a translation or force satisfying a certain criteria is detected (e.g., when a non-tactile switch element is collapsed or otherwise actuated, when a force sensor detects a force above a threshold value, or the like).

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The device 100 may also include other inputs, switches, buttons, or the like. For example, the device 100 includes a button 110. The button 110 may be a movable button (as depicted) or a touch-sensitive region of the housing 102. The button 110 may control various aspects of the device 100. For example, the button 110 may be used to select icons, items, or other objects displayed on the display 109, to activate or deactivate functions (e.g., to silence an alarm or alert), or the like.

Figure 1B:
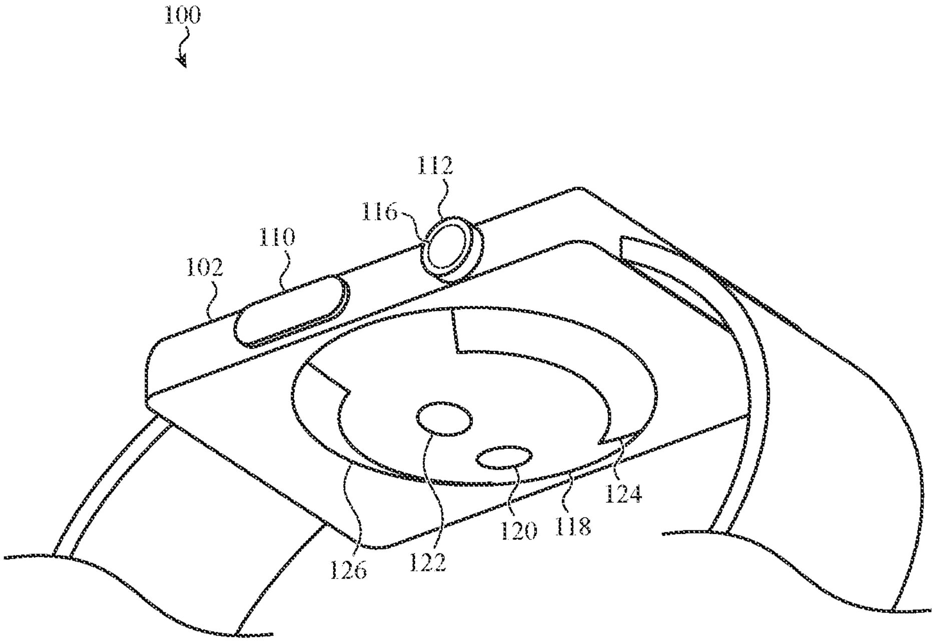

FIG. 1B shows a rear side of the device 100. The device 100 includes a rear cover 118 coupled to the housing 102 and defining at least a portion of the rear exterior surface of the device 100. The rear cover 118 may be formed of or include any suitable material(s), such as sapphire, polymer, ceramic, glass, or any other suitable material.

The rear cover 118 may define a plurality of windows to allow light to pass through the rear cover 118 to and from sensor components within the device 100. For example, the rear cover 118 may define an emitter window 120 and a receiver window 122. While only one each of the emitter and receiver windows are shown, more emitter and/or receiver windows may be included (with corresponding additional emitters and/or receivers within the device 100). The emitter and/or receiver windows 120, 122 may be defined by the material of the rear cover 118 (e.g., they may be light-transmissive portions of the material of the rear cover 118), or they may be separate components that are positioned in holes formed in the rear cover 118. The emitter and receiver windows, and associated internal sensor components, may be used to determine biometric information of a user, such as heart rate, blood oxygen concentrations, and the like, as well as information such as a distance from the device to an object. The particular arrangement of windows in the rear cover 118 shown in FIG. 1B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The rear cover 118 may also include one or more electrodes 124, 126. The electrodes 124, 126 may facilitate input to biometric sensing circuitry or other sensing circuitry within the device 100 (optionally in conjunction with the input feature 116). The electrodes 124, 126 may be a conductive surface that is conductively coupled, via one or more components of the device 100, to the biometric sensing circuitry.

Figure 2:
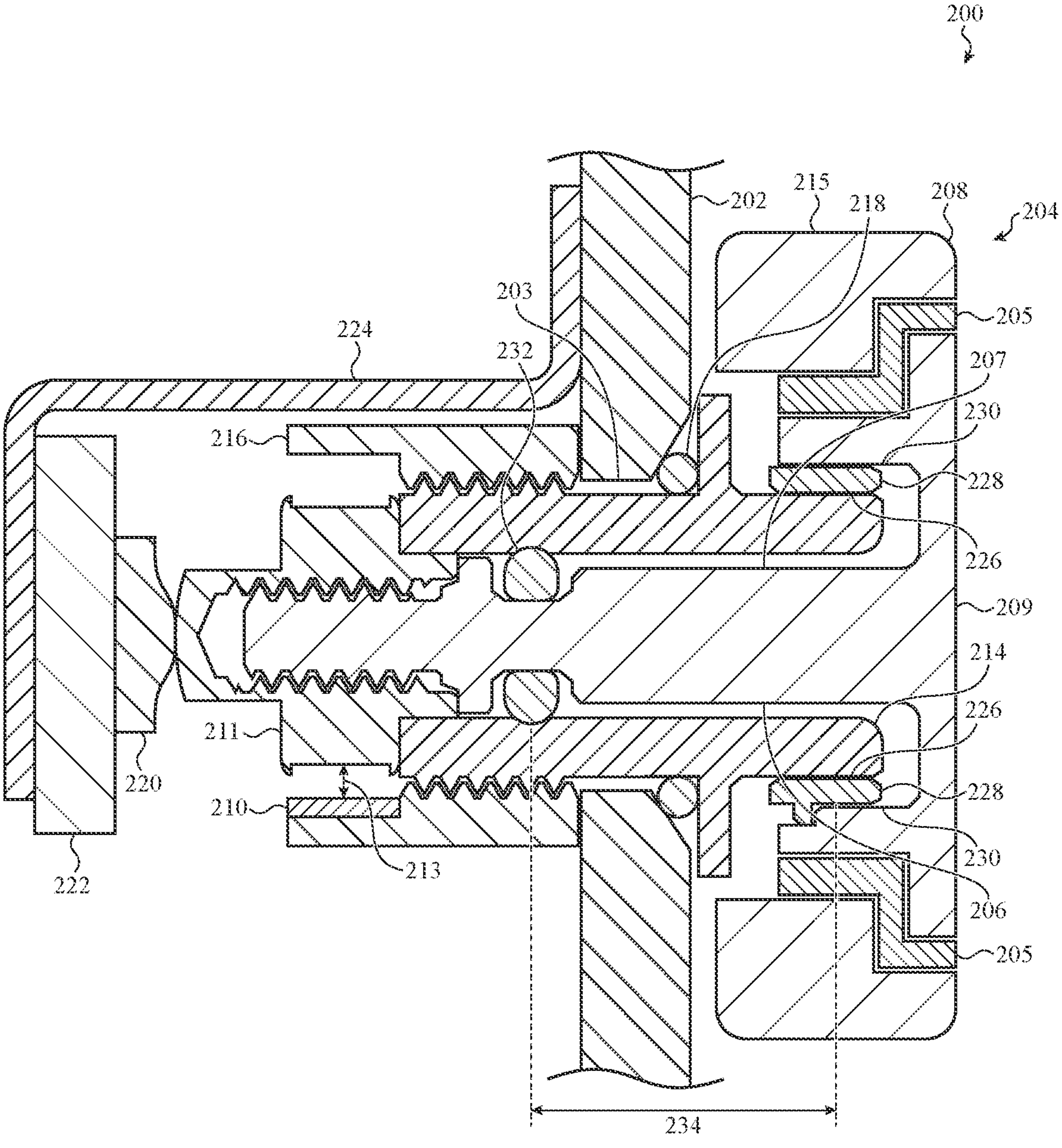
FIG. 2 depicts a partial cross-sectional view of a device with an example crown.

FIG. 2 depicts a partial cross-sectional view of a portion of an electronic device 200 having a crown input system 204 (also referred to herein simply as a crown 204), viewed along line 2-2 in FIG. 1A. The device 200 may correspond to or be an embodiment of the device 100, and the crown 204 may generally correspond to the crown 112 in FIGS. 1A-1B.

As shown in FIG. 2, a device 200 may include a housing with a side wall 202 (which may generally correspond to or be an embodiment of the side wall 101) having an opening 203 (e.g., a through-hole). A crown 204 (which may generally correspond to or be an embodiment of the crown 112) may include a knob 208 that is external to the housing and configured to receive a rotational input, and a shaft assembly 206 that is coupled to the knob and extends through the opening 203 such that it is at least partially within the housing. The knob 208 and shaft assembly 206 may be a single unitary component, or they may include multiple components or pieces coupled together. In either case, a rotational input applied to the knob 208 causes the shaft assembly 206 (or at least a portion thereof) to rotate. The knob 208 may be a single unitary component (e.g., a single piece of metal), or it may include multiple components or pieces coupled together. The shaft assembly 206 may be a single unitary component (e.g., a single piece of metal), or it may include multiple components or pieces coupled together. In some cases, the shaft assembly 206 includes a shaft member 207. The shaft member 207 may be unitary with the knob 208, or it may be a separate component that is attached to the knob 208, such as via threads, mechanical interlocks, adhesives, etc.

As shown, the knob 208 may be defined by a cap portion 209 of the shaft assembly 206, a ring member 215, and a joint structure 205. The cap portion 209 and the ring member 215 may be formed from or include conductive materials, and the joint structure 205 may be formed from or include nonconductive materials, such as a polymer. In some cases, the joint structure 205 electrically isolates the cap portion 209 from the ring member 215 (and optionally structurally couples the cap portion 209 and the ring member 215). In some cases, the cap portion 209 defines a conductive surface for a biometric or physiological sensor (e.g., the input feature 116, FIG. 1B). The joint structure 205 may isolate the cap portion 209 (and thus the conductive input surface) from the ring member 215 to prevent or inhibit conductive couplings via the ring member 215 that may interfere with the operation of the sensor.

A rotation sensing unit 210 may detect rotation of the shaft assembly (e.g., a speed and a direction of rotation of the shaft assembly 206). In some cases, the rotation sensing unit 210 is an optical sensing unit or relies on optical sensing techniques to determine the characteristics of the rotation (e.g., speed and direction of rotation). For example the rotation sensing unit 210 may use laser-based self-mixing interferometry to determine the characteristics of the crown rotation. In one example, a laser module may direct a laser beam onto a surface of the shaft assembly 206, and at least a portion of the laser beam is reflected by the shaft back to the laser module. The interaction between the emitted and reflected light may be used to determine the rotational characteristics of the crown. As another example, the rotation sensing unit 210 may include a light emitter that emits light onto a surface of the shaft assembly, and a separate light detector that receives a reflected portion of the omitted light and determines rotational characteristics of the crown based on the received light. Arrow 213 indicates an example light path between the rotation sensing unit 210 and the shaft assembly 206. Other types of rotation sensors are also contemplated, including optical encoders, resolvers, Hall effect sensors, and the like.

The shaft assembly 206 may include a rotor 211. The rotor 211 may define a surface (e.g., a peripheral exterior surface, also referred to as a reflecting surface) from which the rotation sensing unit 210 detects rotation of the shaft assembly 206. For example, the rotation sensing unit 210 may detect light that is reflected from a reflecting surface of the rotor (which may have originally been emitted by a light emitter of the rotation sensing unit 210) to detect rotational characteristics of the crown. The rotor 211 may include or define trackable elements, including but not limited to ridges, splines, stripes or shapes (e.g., defined by regions of different colors or optical properties, formed by inks, dyes, anodizing, plating, textures, or any other suitable technique and/or surface treatment), magnetic regions, and slots. The rotor 211 may be coupled to the shaft member 207, such as via threads, adhesives, mechanical interlocks, fusion bonding, or the like. In some cases, the rotor 211 is a region of the shaft member 207 (e.g., the rotor 211 may correspond to a region of a surface of the shaft member 207). As depicted in FIG. 2, the rotation sensing unit 210 detects rotation from a cylindrical surface of the rotor 211, though in other examples the rotation sensing unit 210 may detect rotation using a different surface (e.g., by reflecting light from a surface that is generally perpendicular to the axis of rotation of the shaft member 207, such as an axial end surface).

A collar 214 may abut the housing (e.g., the side wall 202), extend through the opening 203, and interlock with a bracket 216. The bracket 216 may overlap the interior side of the side wall 202 and retain the collar 214 in place. A sealing member 218 may be positioned between the housing and the collar 214 and may compress when the collar 214 is interlocked with the bracket 216.

In some cases, a translation sensing element 220, such as a switch element (e.g., a tactile switch, dome switch, etc.), may be positioned past an end of the shaft assembly 206 to detect axial inputs (e.g., translational inputs or other force-based inputs applied to the end of the knob 208). For example, the translation sensing element 220 may be actuated by a distal or inboard end of the shaft assembly of the crown (e.g., the end of the shaft assembly that is opposite the knob). The translation sensing element 220 may optionally be positioned on a substrate 222, such as a circuit board, and may be supported on a support structure 224. The support structure 224 may be coupled to housing (e.g., the side wall 202), or another structure of the device (e.g., the bracket 216). In some cases, the bracket 216 and the support structure 224 are different portions or segments of a single component.

The rotating portions of the crown 204 may be rotationally supported by one or more rotational supports. The rotational supports are structures that are fixed relative to a rotating structure, and which may define an interface between fixed and rotating structures. For example, the collar 214 may define a first rotational support 226 that rotationally supports a rotating structure of the crown 204. In the illustrated example, a bushing 228 is positioned between an interface surface 230 of the knob 208 and the first rotational support 226. The bushing 228 may be retained to the knob 208 or the first rotational support 226, and may define a sliding interface between one or both of the interface surface 230 or the first rotational support 226. The bushing 228 may reduce the friction as compared to direct contact between the interface surface 230 and the first rotational support 226. The bushing 228 may be formed from a polymer, a metal, a composite, or another suitable material. In some cases, bearings, surface coatings (e.g., a deposited metallic coating), surface treatments (e.g., anodization), or the like may be used instead of or in addition to the bushing 228. While the bushing is described as being a separate component from the rotational support, in some cases the bushing defines the interface surface of a rotational support. For example, where the bushing 228 is fixed to the first rotational support 226 (e.g., such that the bushing 228 does not rotate relative to the first rotational support 226), the bushing 228 may define or be part of the first rotational support.

A second rotational support 232 may support the rotating portion of the crown 204 inboard of the first rotational support 226. As shown, the second rotational support 232 may be or may include an O-ring positioned between a surface of the shaft assembly 206 and a surface of the collar 214, though other types of rotational supports are also contemplated (e.g., bushings, bearings, surface coatings, direct contact between the shaft assembly and the collar, etc.). In some cases, additional rotational supports are provided between the rotating and non-rotating portions of the crown 204.

As described herein, crowns may be configured to receive translational or axial inputs as well as rotational inputs. In such cases, portions of the crown may also translate relative to the rotational supports.

The distance 234 between the outermost rotational supports 226, 232 may affect the performance of the crown 204. Larger distances 234 between the outermost rotational supports may provide better alignment, stability, concentricity, and/or other mechanical and/or functional performance, as compared to shorter distances. For example, larger distances may lead to less wobble, better rotational sensing performance, and less risk of damaging internal components from movement of the crown. However, increasing the distance between the rotational supports may ultimately extend the crown components (e.g., switch elements, optical sensing components) further into the interior of the device, thereby occupying space that could be used for other components, such as batteries, processors, and the like (especially in instances where the internal components of the crown extend inwardly from a side wall, which may introduce empty gaps between the side wall and other components that increase device size without improving device functionality).

Figure 3:
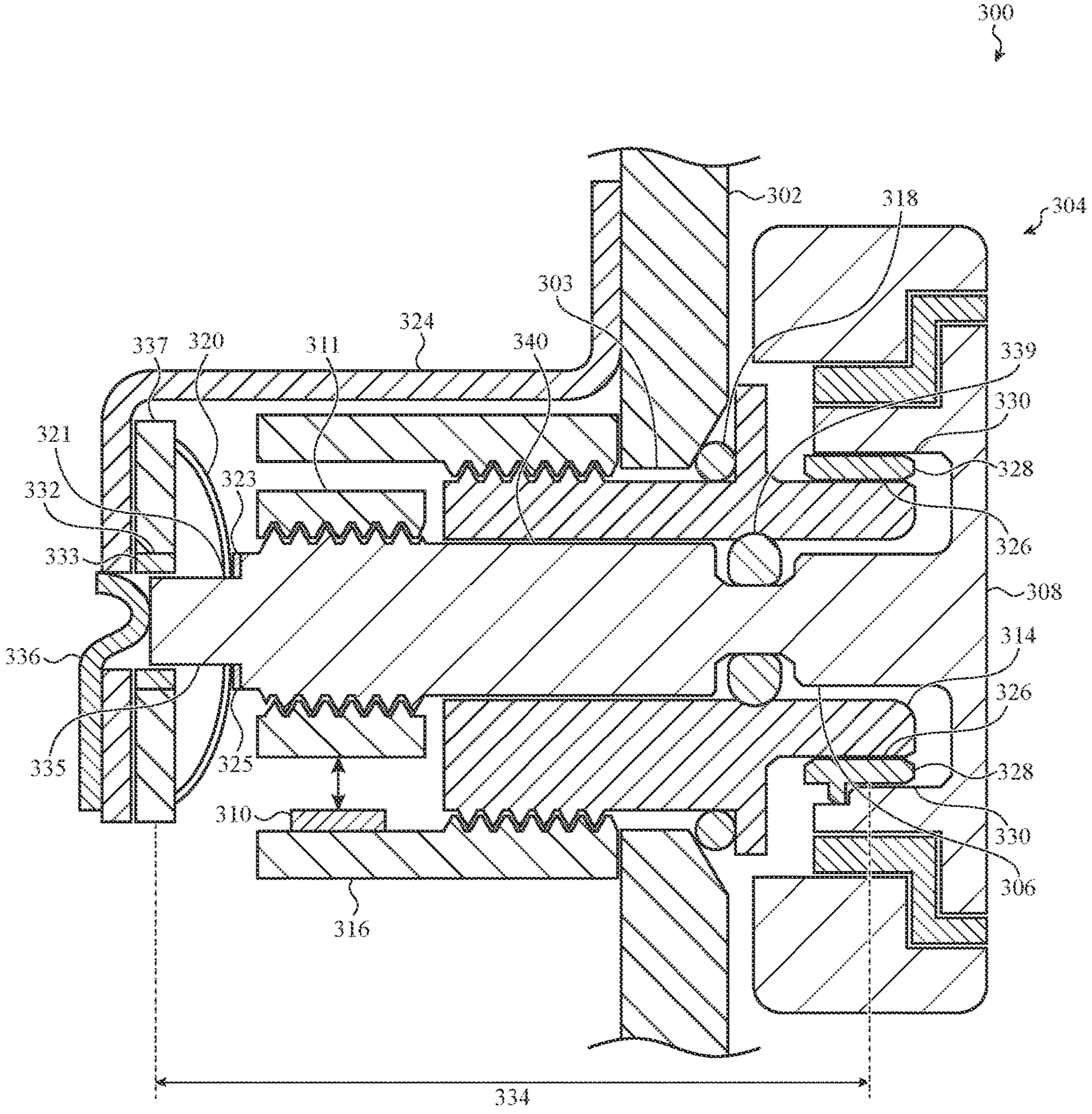
FIG. 3 depicts a partial cross-sectional view of a device with an example crown having a shaft extending through an opening in a switch.

FIG. 3 depicts a partial cross-sectional view of a portion of an electronic device 300 having a crown input system 304 (also referred to herein simply as a crown 304). The device 300 may correspond to or be an embodiment of the device 100, and the crown 304 may generally correspond to the crown 112 in FIGS. 1A-1B.

The device 300 includes a crown 304 in which translation-sensing components (e.g., a tactile switch, dome switch, etc.) of a crown are positioned between the outer ends of the rotating structure, allowing the rotational supports to be positioned further apart than may be achieved when translation-sensing components are positioned at the end of the rotating structure (e.g., when a switch element is positioned at an end of a shaft assembly 206, as shown in FIG. 2).

In particular, FIG. 3 illustrates a crown 304 positioned along a side wall 302 of a device 300 (which may correspond to or be an embodiment of the device 100). The crown 304 (which may generally correspond to or be an embodiment of the crown 112) may include a knob 308 that is external to the housing and configured to receive a rotational input, and a shaft assembly 306 that is coupled to the knob and extends through an opening 303 in the housing such that it is at least partially within the housing. The knob 308 and shaft assembly 306 may generally correspond to the knob 208 and shaft assembly 206 in FIG. 2, and the description of those components applies equally to the knob 308 and the shaft assembly 306.

A rotation sensing unit 310 may detect rotation of the shaft assembly (e.g., a speed and a direction of rotation of the shaft assembly 306). The rotation sensing unit 310 may generally correspond to the rotation sensing unit 210 in FIG. 2, and the description of the rotation sensing unit 210 applies equally to the rotation sensing unit 310.

The shaft assembly 306 may include a rotor 311. The rotor 311 may define a surface (e.g., a peripheral exterior surface) from which the rotation sensing unit 310 detects rotation of the shaft assembly 306. For example, the rotation sensing unit 310 may detect light that is reflected from a reflecting surface of the rotor (which may have originally been emitted by a light emitter of the rotation sensing unit 310) to detect rotational characteristics of the crown. The rotor 311 may generally correspond to the rotor 211 in FIG. 2, and the description of the rotor 211 applies equally to the rotor 311.

A collar 314 may abut the housing (e.g., the side wall 302), extend through the opening 303, and interlock with a bracket 316. The bracket 316 may overlap the interior side of the side wall 302 and retain the collar 314 in place. The collar 314 and the bracket 316 may be shorter than their corresponding components in the crown 204, because the inboard rotational support is no longer positioned within the collar. Thus, in order to meet a minimum target distance between the rotational supports in FIG. 2 (e.g., to satisfy the performance targets for the crown), the collar 214 may need to be relatively long. By contrast, because the inboard rotational support in FIG. 3 is decoupled from the collar 314 (e.g., the collar 314 does not define the available positions for the inboard rotational support), the collar 314 and optionally the bracket 316 may be made shorter (e.g., extend a smaller distance into the internal volume) without negatively impacting the performance of the crown.

The rotating portions of the crown 304 may be rotationally supported by one or more rotational supports. As described herein, the crown 304 may be configured with one rotational support proximate the knob 308, and another rotational support proximate the distal end of the shaft assembly 306 (e.g., at the end opposite the knob 308). To allow the inboard rotational support to be positioned at the distal end of the shaft assembly 306, other components, such as a switch element for translation or axial-input sensing, may be positioned between the rotational supports or otherwise actuated by a portion of the shaft assembly 306 that is between the rotational supports (as opposed to past the distal end of the shaft, as shown in FIG. 2).

The crown 304 may include a first rotational support 326 proximate the knob 308 and a second rotational support 332 proximate the distal end of the shaft assembly 306. As described above, the rotational supports are structures that are fixed relative to a rotating structure, and which may define an interface between fixed and rotating structures. For example, the collar 314 may define the first rotational support 326 that rotationally supports a rotating structure of the crown 304. In the illustrated example, a bushing 328 is positioned between an interface surface 330 of the knob 308 and the first rotational support 326. The bushing 328 may be retained to the knob 308 or the first rotational support 326, and may define a sliding interface between one or both of the interface surface 330 or the first rotational support 326. The bushing 328 may reduce the friction as compared to direct contact between the interface surface 330 and the first rotational support 326. The bushing 328 may be formed from a polymer, a metal, a composite, or another suitable material. In some cases, bearings, surface coatings (e.g., a deposited metallic coating), surface treatments (e.g., anodization), or the like may be used instead of or in addition to the bushing 328. While the bushing is described as being a separate component from the rotational support, in some cases the bushing defines the interface surface of a rotational support. For example, where the bushing 328 is fixed to the first rotational support 326 (e.g., it does not rotate relative to the first rotational support 326), the bushing 328 may define or be part of the first rotational support.

The second rotational support 332 may support the rotating portion of the crown 304 inboard of the first rotational support 326. As shown, the second rotational support 332 may be a hole defined by a bracket assembly 337, and an axle feature 335 of the shaft assembly 306 may extend into the second rotational support 332 (e.g., into the hole) and be rotationally supported by the second rotational support 332. In some cases, a bushing 333 is positioned in a hole in the bracket assembly 337 between a rotating surface of the shaft assembly 306 (e.g., a surface of the axle feature 335) and the second rotational support 332. The bushing 333 may define a hole into which the axle feature 335 extends. The bushing 333 may be retained to the axle feature 335 or to the bracket assembly 337 (or may slide freely along both the axle feature and the bracket assembly), and may define a sliding interface between one or both of the axle feature 335 or the second rotational support 332. The bushing 333 may be formed from a polymer, a metal, a composite, or another suitable material. In some cases, bearings, surface coatings (e.g., a deposited metallic coating), surface treatments (e.g., anodization), or the like may be used instead of or in addition to the bushing 333. While the bushing 333 is described as being a separate component from the second rotational support 332, in some cases the bushing 333 defines the interface surface of the rotational support 332. For example, where the bushing 333 is fixed to the bracket assembly 337 (e.g., such that the bushing 333 does not rotate relative to the bracket assembly 337), the bushing 333 may define or be part of the second rotational support.

The bracket assembly 337 may be supported by a support structure 324. The support structure 324 may be coupled to housing (e.g., the side wall 302), or another structure of the device (e.g., the bracket 316). In some cases, the bracket 316 and the support structure 324 are different portions or segments of a single component.

The crown 304 may include one or more sealing members 318, 340 positioned between components of the crown 304 and/or the device 300. The sealing members 318, 340 may inhibit the ingress of liquids, dust, or other contaminants into the device and/or between components. In some cases, a sealing member (e.g., the sealing member 340) may define a sliding interface between one or more surfaces of the crown 304.

The crown 304 in FIG. 3 positions the first and second rotational supports at opposite ends of the rotating assembly (e.g., the knob 308 and shaft assembly 306), such that the distance between the rotational supports may be maximized for a given length of the rotating assembly. By contrast, the crown shown in FIG. 2 has its rotational supports closer together, with one of the rotational supports (e.g., the second rotational support 232) positioned away from the interior end of the shaft assembly 206 (e.g., towards a middle of the shaft assembly 206). Thus, the distance 334 between the outermost rotational supports in the crown 304 may be greater than the distance 234 between the outermost rotational support in the crown 204. Moreover, because the design of the crown 304 has a greater proportion of the shaft assembly between the rotational supports, crown performance can be maintained or improved (relative to the crown 204, for example) while the overall length of the crown assembly, and the distance it extends into the interior volume of a device, may be decreased.

The positioning of the inboard rotational support 332 at the end of the shaft assembly 306 may be facilitated in part by positioning a switch element 320 between the ends of the shaft assembly 306. More particularly, the switch element 320 may define an opening 321 (e.g., a through-hole) within a collapsible dome region of the switch. The shaft assembly 306 may extend through the opening 321, and an actuation feature 323 of the shaft assembly 306 may actuate the switch element 320 in response to a translational input applied to the crown 304 (e.g., an axial force applied to an end surface of the knob 308). The opening in the switch element 320 and the actuation feature 323 of the shaft assembly allows the shaft assembly 306 to extend through the switch, such that the switch does not need to be positioned past the distal end of the shaft assembly, while still allowing the switch to be actuated by the translational movement of the shaft assembly. As described, because the switch is no longer positioned past the distal or inboard end of the shaft assembly, the overall length of the crown (and the distance that it extends into the internal volume of the device) may be reduced relative to other crown designs. Moreover, because the distal end surface of the shaft assembly no longer needs to contact a switch element, that area of the crown may be available for other functions, such as for the second rotational support of the crown.

The actuation feature 323 may be defined by a portion of the shaft assembly 306. For example, the shaft assembly 306 may include a barrel portion 339 having a first diameter, and an end portion (e.g., the axle feature 335 in the illustrated example) that extends from the barrel portion 339 and has a second diameter that is less than the first diameter. The different diameters result in barrel portion 339 defining a shoulder-like actuation feature that faces the dome or actuation surface of the switch element 320, such that translation of the crown 304 will actuate (e.g., collapse) the switch element 320. While the actuation feature 323 resembles a disk-shaped shoulder, the actuation feature may have other configurations, such as a conical surface or a tab extending from the shaft assembly. Further, the actuation feature of a shaft assembly may be positioned elsewhere along the shaft, and need not be defined by a transition between a barrel portion and an axle feature. For example, a shaft assembly may include a disk-shaped flange extending radially outward from a main shaft portion or barrel, and the flange may define the actuation feature.

The switch element 320 may be positioned on the bracket assembly 337, and may be operatively coupled to a processing system that detects actuation of the switch element 320. For example, the switch element 320 may be formed from or include a conductive material, and a conductor may be positioned in or on the bracket assembly 337, and when the switch element 320 is actuated (e.g., collapsed) by the actuation feature 323 of the shaft assembly, the switch element 320 may contact the conductor. The processing system may detect when the switch element 320 contacts the conductor (e.g., by detecting a closed electrical circuit or path through the switch element 320 and conductor), and take appropriate action in response to detecting the actuation. For example, the processing system may control an operation of the device, such as by changing a device parameter, selecting a displayed icon, changing what is displayed by the device, or perform any other suitable device operation.

The switch element 320 may provide a biasing force to bias the crown 304 outward. The switch element 320, which may be a tactile switch, may also provide a tactile output that may be felt or otherwise perceived by the user. For example, the user may feel a click, detent, or other sensation upon the collapse of the switch element 320, thus indicating to the user that an input has been successfully provided to the device.

In some cases, a friction guard 325 may be positioned between the actuation feature 323 of the shaft assembly 306 and a surface of the switch element 320. The friction guard 325 may be fixed to shaft assembly 306, fixed to the switch element 320, or able to slide relative to both the shaft assembly 306 and the switch element 320. The friction guard 325 may include one or more stacks or layers of a polymer, metal, or other material. In some cases, the friction guard 325 includes a coating or surface treatment on either or both the switch element 320 and the shaft assembly 306, such as a deposited coating (e.g., deposited using plasma vapor deposition (PVD), chemical vapor deposition (CVD) or the like), an anodized layer, or the like. Deposited coatings may include, without limitation, deposited metal coatings, ceramic coating, and diamond or diamond-like coatings.

As noted above, in some cases a crown of a device is used as a conductive path or electrode for a biometric or physiological sensor, such as an electrocardiogramaensor. Accordingly, the crown (and in particular the shaft assembly 306 or other components that define the conductive path for the sensor) may be electrically isolated from other components in order to facilitate operation of the biometric sensor. Thus, in some cases, the friction guard 325 conductively isolates the shaft assembly 306 from the switch element 320. In such cases, the friction guard 325 may be formed of a nonconductive material and/or coating such as a polymer, ceramic, or the like.

In cases where a crown is used as an electrode for a biometric or physiological sensor, the crown may define a conductive path from a conductive surface of the knob 308 to a processing system that determines a biological parameter of a user based at least in part on a voltage detected at the conductive surface. For example, a surface of the knob 308 (e.g., the end surface defined by a cap portion) may be formed from a conductive material, and may be conductively coupled to the shaft assembly 306, which may also be formed from a conductive material or otherwise define a conductive path. A conductive contact 336 may contact the shaft assembly 306, and a conductive element (e.g., a conductive trace, wire, flexible circuit board or other conductive element) may conductively couple the conductive contact 336 to the processing system that determines the biological parameter. The conductive contact 336 may be compliant and may be biased towards the shaft assembly 306. Thus, the conductive contact 336 may deflect when the shaft assembly 306 translates due to the crown 304 being pressed axially, while still remaining in physical contact with (and thus conductively coupled to) the shaft assembly 306. The conductive contact 336 may be formed from or include a metal or another conductive material that conductively couples the shaft assembly 306 (or other component of the crown 304) to a processing system.

Figure 4:
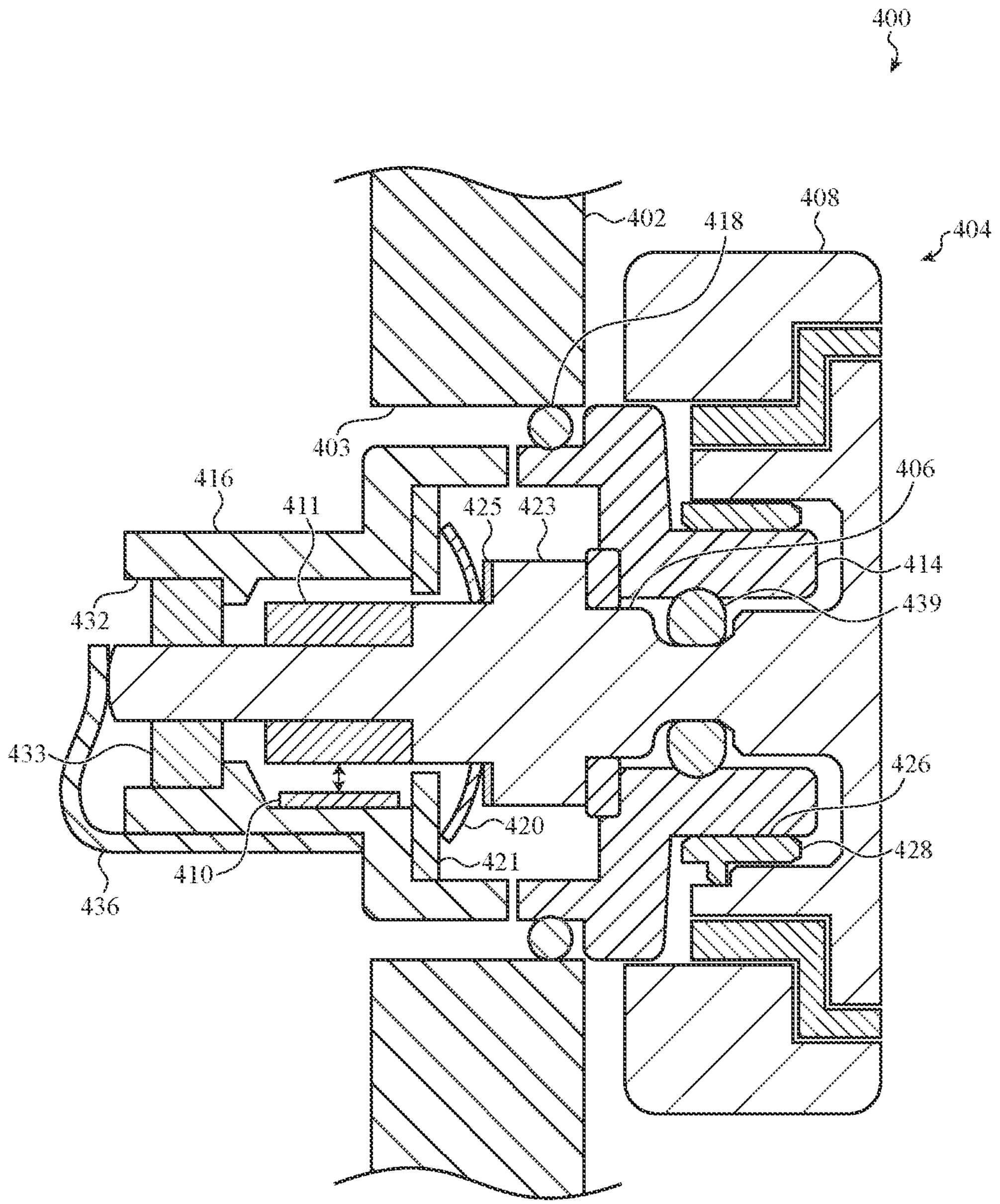
FIG. 4 depicts a partial cross-sectional view of a device with another example crown having a shaft extending through an opening in a switch.

FIG. 4 depicts a partial cross-sectional view of a portion of an electronic device 400 having a crown input system 404 (also referred to herein simply as a crown 404). The device 400 may correspond to or be an embodiment of the device 100, and the crown 404 may generally correspond to the crown 112 in FIGS. 1A-1B.

The device 400 includes another example crown 404 that includes translation-sensing components (e.g., a switch element) positioned between the outer ends of the rotating structure, allowing the rotational supports to be positioned further apart than may be achieved when translation-sensing components are positioned at the end of the rotating structure (e.g., when a switch element is positioned at an end of a shaft assembly 206, as shown in FIG. 2).

In particular, FIG. 4 illustrates a crown 404 positioned along a side wall 402 of a device 400 (which may correspond to or be an embodiment of the device 100). The crown 404 (which may generally correspond to or be an embodiment of the crown 112) may include a knob 408 that is external to the housing and configured to receive a rotational input, and a shaft assembly 406 that is coupled to the knob and extends through an opening 403 in the housing such that it is at least partially within the housing. The knob 408 and shaft assembly 406 may generally correspond to the knob 208 and shaft assembly 206 in FIG. 2, and the description of those components applies equally to the knob 408 and the shaft assembly 406.

A rotation sensing unit 410 may detect rotation of the shaft assembly (e.g., a speed and a direction of rotation of the shaft assembly 406). The rotation sensing unit 410 may generally correspond to the rotation sensing unit 210 in FIG. 2, and the description of the rotation sensing unit 210 applies equally to the rotation sensing unit 410.

The shaft assembly 406 may include a rotor 411. The rotor 411 may define a surface (e.g., a peripheral exterior surface or reflecting surface) from which the rotation sensing unit 410 detects rotation of the shaft assembly 406. The rotor 411 may generally correspond to the rotor 211 in FIG. 2, and the description of the rotor 211 applies equally to the rotor 411.

A collar 414 may abut the housing (e.g., the side wall 402), extend at least partially through the opening 403, and couple to a bracket 416 (e.g., via a threaded interface or other suitable attachment technique). The collar 414 may define a first rotational support 426 proximate the knob 408, and the bracket 416 may define a second rotational support 432 proximate the distal end of the shaft assembly 406 (e.g., the end of the rotating structure that is opposite the knob 408). Similar to the rotational supports of FIG. 3, the collar 414 (or the bushing 428) may define the first rotational support 426. In the illustrated example, the bushing 428 is positioned between an interface surface of the knob 408 and the first rotational support 426. The bushing 428 may be similar to the bushing 328 in FIG. 3, and the description of the bushing 328 applies equally to the bushing 428.

To allow the inboard rotational support to be positioned at the distal end of the shaft assembly 406, other components, such as a switch element for translation or axial-input sensing, may be positioned between the rotational supports, as described with respect to FIG. 3. For example, in FIG. 4, the bracket 416 may support a switch element 420 that defines an opening (e.g., a through-hole) within a collapsible dome region of the switch element, and the shaft assembly 406 may extend through the hole in the switch element 420. Further, the shaft assembly 406 may include or define an actuation feature 423 that actuates the switch element 420 in response to a translational input applied to the crown 404 (e.g., an axial force applied to an end surface of the knob 408). The opening in the switch element 420 and the actuation feature 423 of the shaft assembly allows the shaft assembly 406 to extend through the switch element, such that the switch element does not need to be positioned past the distal end of the shaft assembly, while still allowing the switch element to be actuated by the translational movement of the shaft assembly. As described, because the switch element is no longer positioned past the distal or inboard end of the shaft assembly, the overall length of the crown (and the distance that it extends into the internal volume of the device) may be reduced relative to other crown designs. Moreover, because the distal end surface of the shaft assembly no longer needs to contact a switch element, that area of the crown may be available for other functions, such as for the second rotational support of the crown.

The actuation feature 423 may be defined by a portion of the shaft assembly 406. For example, as shown in FIG. 4, the shaft assembly 406 defines a disk-shaped feature that overlaps the switch element 420 and actuates (e.g., collapses) the switch element 420 when the crown is pressed. The switch element 420 may be supported by the bracket 416. In some cases, the switch element 420 is positioned on a substrate 421 that is coupled to the bracket 416. The switch element 420 may be operatively coupled to a processing system that detects actuation of the switch element 420. For example, the switch element 420 may be formed from or include a conductive material, and a conductor may be positioned on the substrate 421 (or the bracket 416). When the switch element 420 is actuated (e.g., collapsed) by the actuation feature 423 of the shaft assembly, the switch element 420 may contact the conductor, thereby closing a circuit and allowing the processing system to detect the actuation. The processing system may take appropriate action in response to detecting the actuation, as described with respect to FIG. 3. The switch element 420 may provide a biasing force to bias the crown 404 outward. The switch element 420 may also provide a tactile output that may be felt or otherwise perceived by the user. For example, the user may feel a click, detent, or other sensation upon the collapse of the switch element 420, thus indicating to the user that an input has been successfully provided to the device.

In some cases, a friction guard 425 may be positioned between the actuation feature 423 of the shaft assembly 406 and a surface of the switch element 420. The friction guard 425 may be fixed to the shaft assembly 406, fixed to the switch element 420, or able to slide relative to both the shaft assembly 406 and the switch element 420. The friction guard 425 may generally correspond to the friction guard 325 in FIG. 3, and the description of that component applies equally to the friction guard 425.

The second rotational support 432 may support the rotating portion of the crown 404 inboard of the first rotational support 426. As shown, the second rotational support 432 may be defined by the bracket 416, and/or by a bushing 433. Where the bushing 433 is fixed to the bracket 416 (e.g., such that the bushing 433 does not rotate relative to the bracket 416), the bushing 433 may define or be part of the second rotational support. The bushing 433 may generally correspond to the bushing 333 in FIG. 3, and the description of the bushing 333 applies equally to the bushing 433.

The crown 404 may include one or more sealing members 418, 439 positioned between components of the crown 404 and/or the device 400. The sealing members 418, 439 may inhibit the ingress of liquids, dust, or other contaminants into the device and/or between components. In some cases, a sealing member (e.g., the sealing member 439) may define a sliding interface between one or more surfaces of the crown 404.

In cases where a crown is used as an electrode for a biometric or physiological sensor, the crown may define a conductive path from a conductive surface of the knob 408 to a processing system that determines a biological parameter of a user based at least in part on a voltage detected at the conductive surface. For example, a surface of the knob 408 (e.g., the end surface defined by a cap portion) may be formed from a conductive material, and may be conductively coupled to the shaft assembly 406, which may also be formed from a conductive material or otherwise define a conductive path. A conductive contact 436 may contact the shaft assembly 406 (e.g., at the axial end surface at the distal end of the shaft assembly 406), and a conductive element (e.g., a conductive trace, wire, flexible circuit board or other conductive element) may conductively couple the conductive contact 436 to the processing system that determines the biological parameter. The conductive contact 436 may generally correspond to the conductive contact 336 in FIG. 3, and the description of the conductive contact 336 applies equally to the conductive contact 436.

Figure 5:
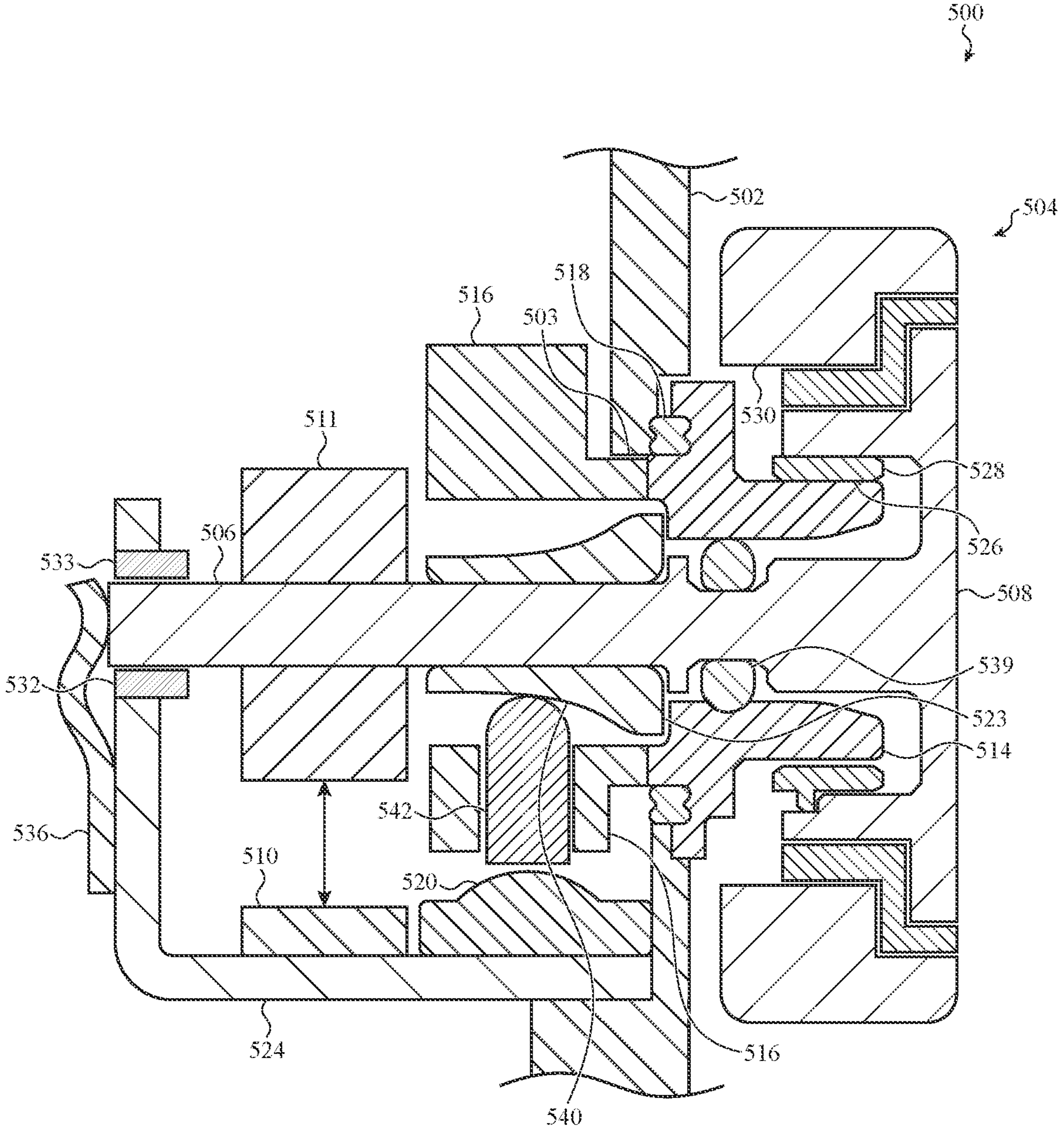
FIG. 5 depicts a partial cross-sectional view of a device with an example crown having a switch positioned along a side of a shaft.

FIG. 5 depicts a partial cross-sectional view of a portion of an electronic device 500 having a crown input system 504 (also referred to herein simply as a crown 504). The device 500 may correspond to or be an embodiment of the device 100, and the crown 504 may generally correspond to the crown 112 in FIGS. 1A-1B.

The device 500 includes another example crown 504 that positions its translation-sensing components (e.g., a switch element) somewhere other than past the distal or inboard end of the shaft assembly of the crown 504. More particularly, in this example, a switch element (e.g., the switch element 520) may be positioned along a side of the shaft assembly, and may be actuated by an actuation force that is not parallel to the translational movement of the shaft assembly (or otherwise not parallel to the longitudinal axis of the shaft assembly). For example, a cam, linkage, or other mechanism may convert the translational movement of a translational/axial input to the crown to a force in a different direction, which actuates a non-axial mounted switch element (or other suitable switch or sensing mechanism). The cam, linkage, or other mechanism may interact with the shaft assembly between the outer ends of the shaft assembly (e.g., between the knob and the distal end of the shaft assembly), allowing the rotational supports to be positioned further apart than may be achieved when translation-sensing components are positioned at the end of the rotating structure (e.g., when a switch element is positioned at an end of a shaft assembly 206, as shown in FIG. 2).

In particular, FIG. 5 illustrates a crown 504 positioned along a side wall 502 of a device 500 (which may correspond to or be an embodiment of the device 100). The crown 504 (which may generally correspond to or be an embodiment of the crown 112) may include a knob 508 that is external to the housing and configured to receive a rotational input, and a shaft assembly 506 that is coupled to the knob and extends through an opening 503 in the housing such that it is at least partially within the housing. The knob 508 and shaft assembly 506 may generally correspond to the knob 208 and shaft assembly 206 in FIG. 2, and the description of those components applies equally to the knob 508 and the shaft assembly 506.

A rotation sensing unit 510 may detect rotation of the shaft assembly (e.g., a speed and a direction of rotation of the shaft assembly 506). The rotation sensing unit 510 may generally correspond to the rotation sensing unit 210 in FIG. 2, and the description of the rotation sensing unit 210 applies equally to the rotation sensing unit 510.

The shaft assembly 506 may include a rotor 511. The rotor 511 may define a surface (e.g., a peripheral exterior surface or reflecting surface) from which the rotation sensing unit 510 detects rotation of the shaft assembly 506. The rotor 511 may generally correspond to the rotor 211 in FIG. 2, and the description of the rotor 211 applies equally to the rotor 511.

A collar 514 may abut the housing (e.g., the side wall 502), extend at least partially through the opening 503, and couple to a bracket 516 (e.g., via a threaded interface or other suitable attachment technique). A support structure 524 may be positioned within the device and may support components of the crown, as described herein. The support structure 524 may be coupled to the bracket 516, the side wall 502, or another structure of the device.

The collar 514 may define a first rotational support 526 proximate the knob 508, and the support structure 524 may define a second rotational support 532 proximate the distal end of the shaft assembly 506 (e.g., the end of the rotating structure that is opposite the knob 508). Similar to the rotational supports of FIG. 3, the collar 514 (or the bushing 528) may define the first rotational support 526. In the illustrated example, the bushing 528 is positioned between an interface surface of the knob 508 and the first rotational support 526. The bushing 528 may be similar to the bushing 328 in FIG. 3, and the description of the bushing 328 applies equally to the bushing 528.

The second rotational support 532 may support the rotating portion of the crown 504 inboard of the first rotational support 526. As shown, the second rotational support 532 may be defined by the support structure 524, and/or by a bushing 533. Where the bushing 533 is fixed to the support structure 524 (e.g., such that the bushing 533 does not rotate relative to the support structure 524), the bushing 533 may define or be part of the second rotational support. The bushing 533 may generally correspond to the bushing 333 in FIG. 3, and the description of the bushing 333 applies equally to the bushing 533.

The crown 504 may include one or more sealing members 518, 539 positioned between components of the crown 504 and/or the device 500. The sealing members 518, 539 may inhibit the ingress of liquids, dust, or other contaminants into the device and/or between components. In some cases, a sealing member (e.g., the sealing member 539) may define a sliding interface between one or more surfaces of the crown 504.

As described above, the switch element in the crown 504 may be positioned along a side of the shaft assembly, and actuated by a mechanism that changes the direction of force applied to the knob 508 (e.g., an axial force) in order to actuate the switch element with a force along a direction that is not parallel to the input force. This arrangement allows the switch element to be actuated without it being positioned past the distal end of the shaft assembly, thereby allowing the distal end of the shaft assembly to be used for the inboard rotational support (and resulting in a shorter overall length of the crown components without compromising performance).

Returning to FIG. 5, the crown shaft assembly 506 includes a cam element 523 that is configured to translate in conjunction with translation of the shaft assembly 506. The cam element 523 defines a cam surface 540 that contacts a plunger 542. The plunger 542 may be held captive by the bracket 516 or another structure of the device 500. When an axial or translational input is applied to the knob 508, the shaft assembly 506 translates inward, causing the cam surface 540 to slide against the plunger 542, and the curvature (and/or angle) of the cam surface 540 causes the plunger 542 to translate in a direction different than the translation of the shaft assembly 506. In the illustrated example, the plunger 542 moves in a direction that is perpendicular to the translation of the crown shaft, though in other examples the plunger 542 may move in a different direction (e.g., any direction oblique to the translation direction of the shaft assembly 506). The plunger may be positioned relative to the switch element 520 such that translation of the plunger 542 causes actuation (e.g., collapse) of the switch element 520 when the shaft assembly 506 is translated a sufficient distance. As described herein with respect to other switch elements, the switch element 520 may be operatively coupled to a processing system that detects actuation of the switch element 520 (e.g., by detecting closure of a circuit when the switch element 520 collapses). The switch element 520 (which may be a tactile switch) may also provide a tactile output that may be felt or otherwise perceived by the user. For example, the user may feel a click, detent, or other sensation upon the collapse of the switch element 520, thus indicating to the user that an input has been successfully provided to the device.

The cam element 523 may be configured to rotate with the shaft assembly 506, or the shaft assembly 506 may be configured to rotate independently of the cam element 523. Where the shaft assembly 506 rotates independently of the cam element 523, the cam surface 540 may not slide against the plunger 542 when the crown is rotated. Where the cam element 523 rotates with the shaft assembly 506, the cam surface 540 may slide against the plunger 542 when the crown is rotated. In either case, bushings, bearings, surface treatments, or surface coatings (or combinations thereof) may be used at the sliding interfaces to reduce or mitigate friction during rotation and/or translation. In some cases, the plunger 542 may be configured so that it is not in contact with the cam surface 540 when the crown is in a rest (e.g., outwardly biased) position, thereby eliminating friction between the plunger and shaft assembly 506 when the crown is rotated.

By actuating the switch element 520 with a mechanism other than the shaft, the switch element 520 does not experience a sliding friction when the crown is rotated, which may obviate the need to include friction mitigating materials and construction between the shaft assembly and the switch element. In some cases, less robust switch elements may be used, as the switch does not experience as much friction as in other examples.

In cases where a crown is used as an electrode for a biometric or physiological sensor, the crown may define a conductive path from a conductive surface of the knob 508 to a processing system that determines a biological parameter of a user based at least in part on a voltage detected at the conductive surface. For example, a surface of the knob 508 (e.g., the end surface defined by a cap portion) may be formed from a conductive material, and may be conductively coupled to the shaft assembly 506, which may also be formed from a conductive material or otherwise define a conductive path. A conductive contact 536 may contact the shaft assembly 506 (e.g., at the axial end surface at the distal end of the shaft assembly 506), and a conductive element (e.g., a conductive trace, wire, flexible circuit board or other conductive element) may conductively couple the conductive contact 536 to the processing system that determines the biological parameter. The conductive contact 536 may generally correspond to the conductive contact 336 in FIG. 3, and the description of the conductive contact 336 applies equally to the conductive contact 536.

The conductive contact 536 may also provide a biasing force to bias the crown 504 outward. For example, the conductive contact 536 may act as a spring that deflects inwards when the crown is pressed inwards, and applies a returning force to push the crown 504 back outwards (e.g., towards its rest position) when the translational force is removed from the knob 508.

As noted above, in crowns that are used as a conductive path for detecting a biological parameter, the crown may need to be electrically isolated from other conductive components and systems. Accordingly, the plunger 542 and/or the cam element 523 may be formed from a nonconductive material (e.g., a polymer) or otherwise be configured to be nonconductive to conductively isolate the switch element 520 from the shaft assembly 506. Additionally or alternatively, the switch element 520 (and/or the interface surfaces of the shaft assembly 506, plunger 542, and cam element 523) may be formed from or include a nonconductive material, such as a polymer coating or layer.

Figure 6:
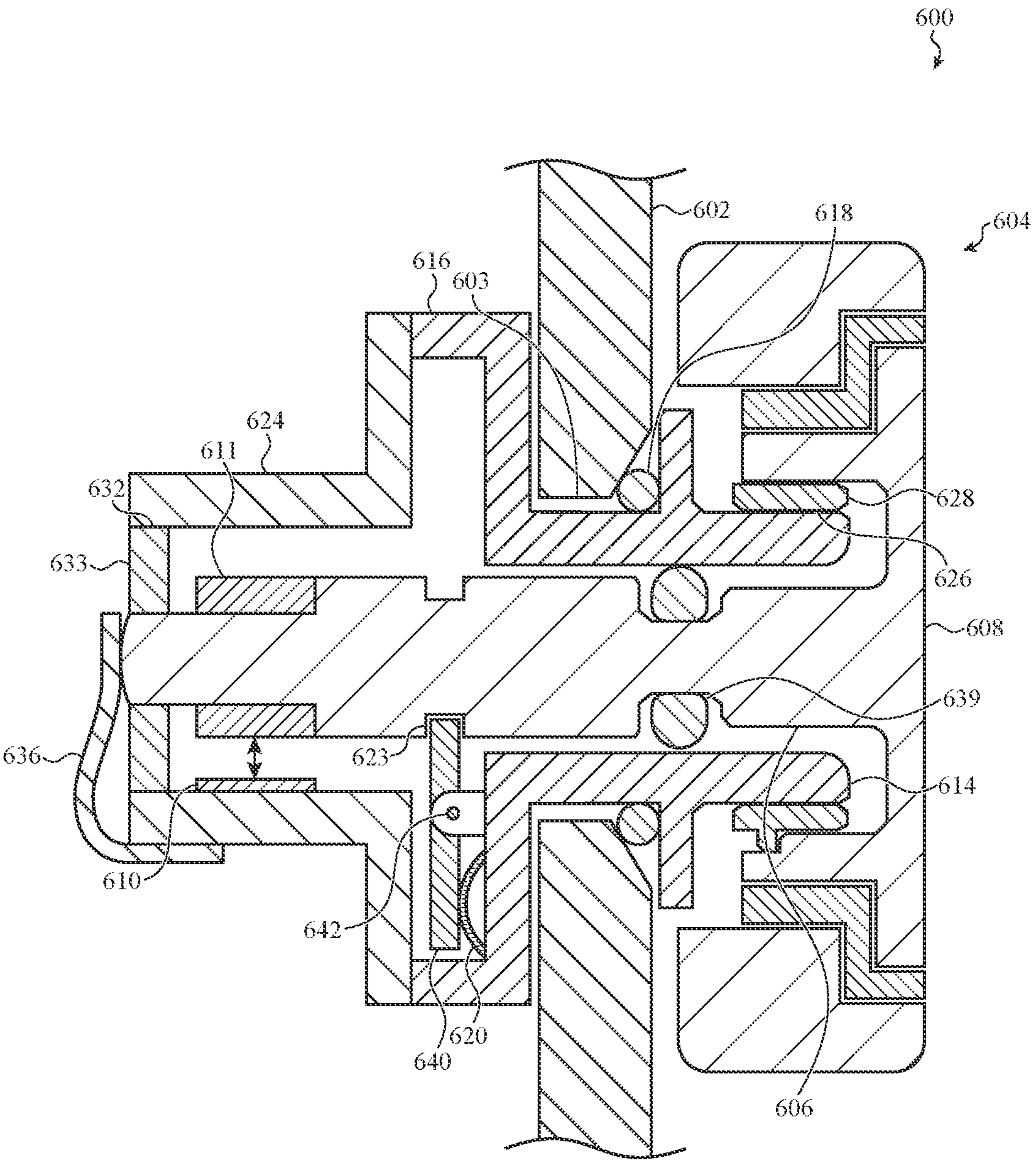
FIG. 6 depicts a partial cross-sectional view of a device with another example crown having a switch positioned along a side of a shaft.

FIG. 6 depicts a partial cross-sectional view of a portion of an electronic device 600 having a crown input system 604 (also referred to herein simply as a crown 604). The device 600 may correspond to or be an embodiment of the device 100, and the crown 604 may generally correspond to the crown 112 in FIGS. 1A-1B.

The device 600 includes another example crown 604 that positions its translation-sensing components (e.g., a switch element) somewhere other than past the distal or inboard end of the shaft assembly of the crown 604. More particularly, in this example, a switch element (e.g., the switch element 620) may be positioned along a side of the shaft assembly, and may be actuated by an actuation mechanism. For example, a linkage mechanism may convert the translational movement of a translational/axial input to the crown to a force in a different direction, which actuates a non-axial mounted switch element (or other suitable switch or sensing mechanism). The linkage mechanism may interact with the shaft assembly between the outer ends of the shaft assembly (e.g., between the knob and the distal end of the shaft assembly), allowing the rotational supports to be positioned further apart than may be achieved when translation-sensing components are positioned at the end of the rotating structure (e.g., when a switch element is positioned past an end of a shaft assembly 206, as shown in FIG. 2).

In particular, FIG. 6 illustrates a crown 604 positioned along a side wall 602 of a device 600 (which may correspond to or be an embodiment of the device 100). The crown 604 (which may generally correspond to or be an embodiment of the crown 112) may include a knob 608 that is external to the housing and configured to receive a rotational input, and a shaft assembly 606 that is coupled to the knob and extends through an opening 603 in the housing such that it is at least partially within the housing. The knob 608 and shaft assembly 606 may generally correspond to the knob 208 and shaft assembly 206 in FIG. 2, and the description of those components applies equally to the knob 608 and the shaft assembly 606.

A rotation sensing unit 610 may detect rotation of the shaft assembly (e.g., a speed and a direction of rotation of the shaft assembly 606). The rotation sensing unit 610 may generally correspond to the rotation sensing unit 210 in FIG. 2, and the description of the rotation sensing unit 210 applies equally to the rotation sensing unit 610.

The shaft assembly 606 may include a rotor 611. The rotor 611 may define a surface (e.g., a peripheral exterior surface or reflecting surface) from which the rotation sensing unit 610 detects rotation of the shaft assembly 606. The rotor 611 may generally correspond to the rotor 211 in FIG. 2, and the description of the rotor 211 applies equally to the rotor 611.

A collar 614 may abut the housing (e.g., the side wall 602), extend at least partially through the opening 603, and couple to a bracket 616 (e.g., via a threaded interface or other suitable attachment technique). A support structure 624 may be positioned within the device and may support components of the crown, as described herein. The support structure 624 may be coupled to the bracket 616, the side wall 602, or another structure of the device.

The collar 614 may define a first rotational support 626 proximate the knob 608, and the support structure 624 may define a second rotational support 632 proximate the distal end of the shaft assembly 606 (e.g., the end of the rotating structure that is opposite the knob 608). Similar to the rotational supports of FIG. 3, the collar 614 (or the bushing 628) may define the first rotational support 626. In the illustrated example, the bushing 628 is positioned between an interface surface of the knob 608 and the first rotational support 626. The bushing 628 may be similar to the bushing 328 in FIG. 3, and the description of the bushing 328 applies equally to the bushing 628.

The second rotational support 632 may support the rotating portion of the crown 604 inboard of the first rotational support 626. As shown, the second rotational support 632 may be defined by the support structure 624, and/or by a bushing 633. Where the bushing 633 is fixed to the support structure 624 (e.g., such that the bushing 633 does not rotate relative to the support structure 624), the bushing 633 may define or be part of the second rotational support. The bushing 633 may generally correspond to the bushing 333 in FIG. 3, and the description of the bushing 333 applies equally to the bushing 633.

The crown 604 may include one or more sealing members 618, 639 positioned between components of the crown 604 and/or the device 600. The sealing members 618, 639 may inhibit the ingress of liquids, dust, or other contaminants into the device and/or between components. In some cases, a sealing member (e.g., the sealing member 639) may define a sliding interface between one or more surfaces of the crown 604.

As described above, the switch element in the crown 604 may be positioned along a side of the shaft assembly, and actuated by a mechanism that changes the direction of force applied to the knob 608 (e.g., an axial force) in order to actuate the switch element. This arrangement allows the switch element to be actuated without it being positioned past the distal end of the shaft assembly, thereby allowing the distal end of the shaft assembly to be used for the inboard rotational support (and resulting in a shorter overall length of the crown components without compromising performance).

Returning to FIG. 6, the crown shaft assembly 606 includes a lever 640 that engages the shaft assembly 606 at an engagement feature 623 of the shaft assembly 606 and pivots or otherwise articulates about a pivot structure 642. In some cases, engagement feature 623 is a slot defined in the shaft assembly 606 (e.g., a concentric slot extending about the circumference of the shaft assembly 606), and the lever extends into the slot. When an axial or translational input is applied to the knob 608, the shaft assembly 606 translates inward, thereby moving a first end of the lever which causes the lever to pivot about the pivot structure 642 and causes a second end of the lever to actuate the switch element 620.

As described herein with respect to other switch elements, the switch element 620 may be operatively coupled to a processing system that detects actuation of the switch element 620 (e.g., by detecting closure of a circuit when the switch element 620 collapses). The switch element 620 may also provide a tactile output that may be felt or otherwise perceived by the user. For example, the user may feel a click, detent, or other sensation upon the collapse of the switch element 620, thus indicating to the user that an input has been successfully provided to the device.

The shaft assembly 606 may be configured to slide relative to the first end of the lever 640 when the shaft assembly 606 rotates. Accordingly, bushings, bearings, surface treatments, or surface coatings (or combinations thereof) may be used at the sliding interfaces to reduce or mitigate friction during rotation and/or translation.

By actuating the switch element 620 with a mechanism other than the shaft, the switch element 620 does not experience a sliding friction when the crown is rotated, which may obviate the need to include friction mitigating materials and construction between the shaft assembly and the switch element. In some cases, less robust switch elements may be used, as the switch does not experience as much friction as in other examples.

In cases where a crown is used as an electrode for a biometric or physiological sensor, the crown may define a conductive path from a conductive surface of the knob 608 to a processing system that determines a biological parameter of a user based at least in part on a voltage detected at the conductive surface. For example, a surface of the knob 608 (e.g., the end surface defined by a cap portion) may be formed from a conductive material, and may be conductively coupled to the shaft assembly 606, which may also be formed from a conductive material or otherwise define a conductive path. A conductive contact 636 may contact the shaft assembly 606 (e.g., at the axial end surface at the distal end of the shaft assembly 606), and a conductive element (e.g., a conductive trace, wire, flexible circuit board or other conductive element) may conductively couple the conductive contact 636 to the processing system that determines the biological parameter. The conductive contact 636 may generally correspond to the conductive contact 336 in FIG. 3, and the description of the conductive contact 336 applies equally to the conductive contact 636.

The conductive contact 636 may also provide a biasing force to bias the crown 604 outward. For example, the conductive contact 636 may act as a spring that deflects inwards when the crown is pressed inwards, and applies a returning force to push the crown 604 back outwards (e.g., towards its rest position) when the translational force is removed from the knob 608.

As noted above, in crowns that are used as a conductive path for detecting a biological parameter, the crown may need to be electrically isolated from other conductive components and systems. Accordingly, the lever 640 may be formed from a nonconductive material (e.g., a polymer) or otherwise be configured to be nonconductive to conductively isolate the switch element 620 from the shaft assembly 606. Additionally or alternatively, the switch element 620 and/or the interface surfaces of the shaft assembly 606 and the lever 640 may be formed from or include a nonconductive material, such as a polymer coating or layer.

Figure 7A:
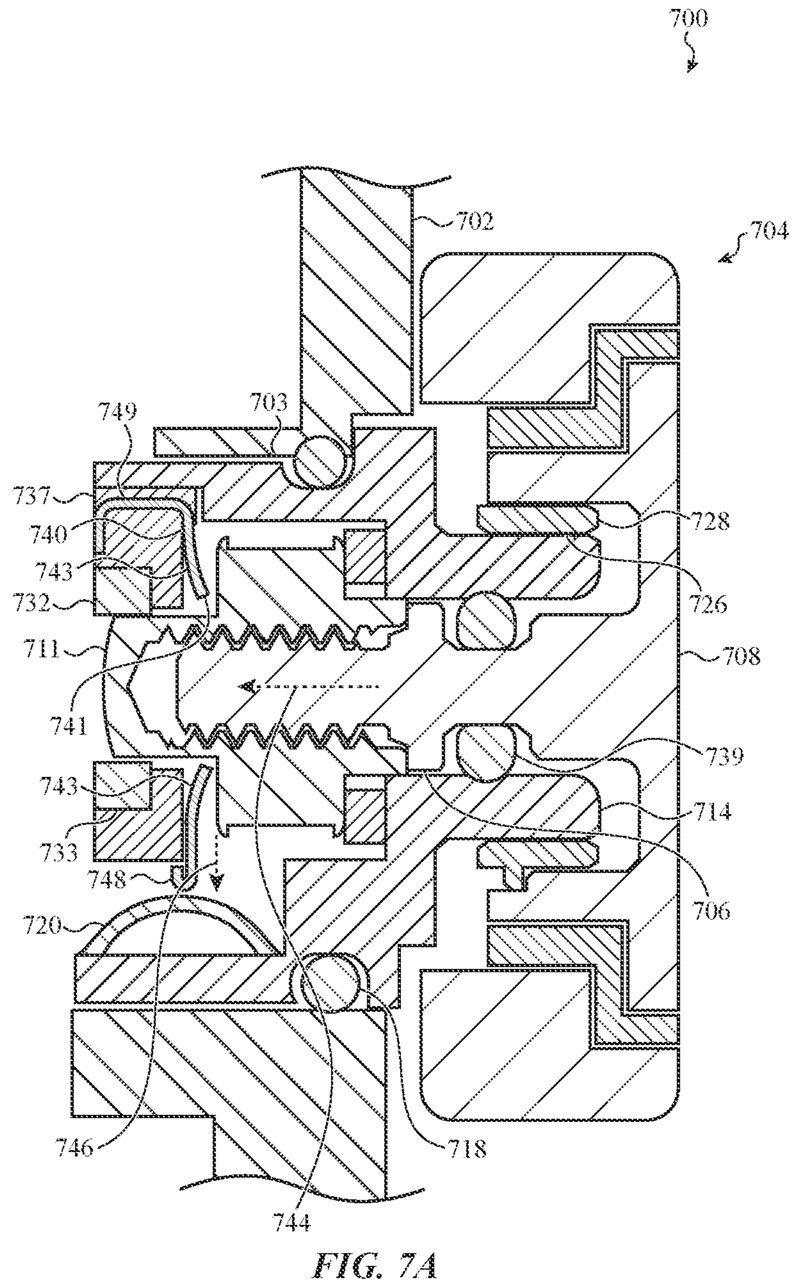
FIG. 7A depicts a partial cross-sectional view of a device with another example crown having a switch positioned along a side of a shaft.
Figure 7B:
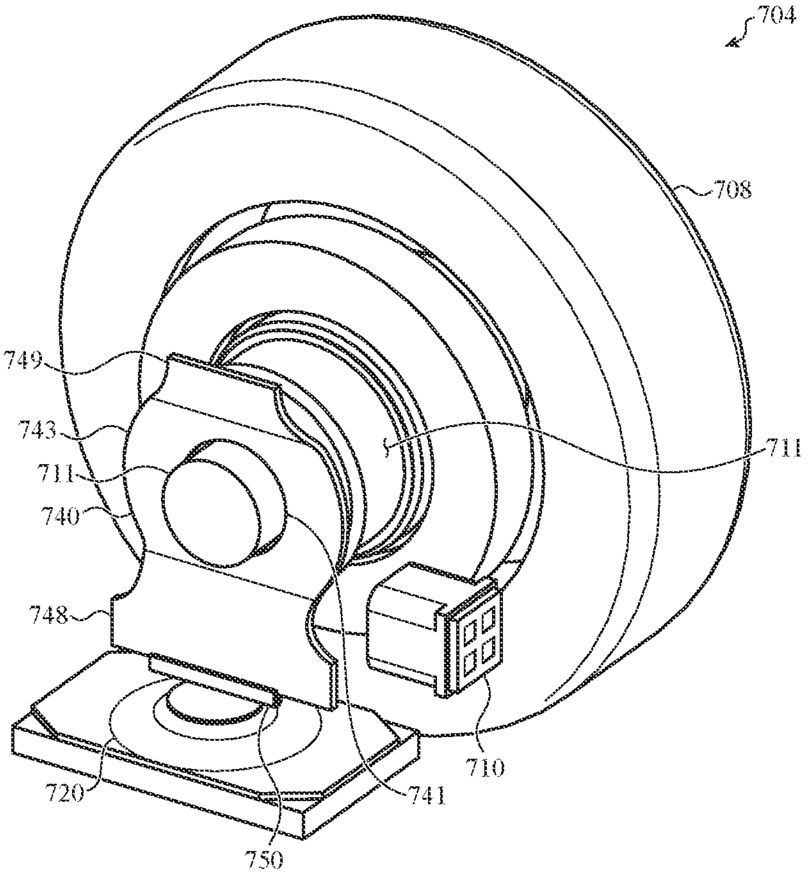
FIG. 7B depicts a perspective view of the crown of FIG. 7A.

FIG. 7A depicts a partial cross-sectional view of a portion of an electronic device 700 having a crown input system 704 (also referred to herein simply as a crown 704). FIG. 7B depicts a perspective view of the crown 704 viewed from the back of the crown 704. The device 700 may correspond to or be an embodiment of the device 100, and the crown 704 may generally correspond to the crown 112 in FIGS. 1A-1B.

The device 700 includes another example crown 704 that positions its translation-sensing components (e.g., a switch element) somewhere other than past the distal or inboard end of the shaft assembly of the crown 704. More particularly, in this example, a switch element (e.g., the switch element 720) may be positioned along a side of the shaft assembly, and may be actuated by an actuation force that is not parallel to the translational movement of the shaft assembly (or otherwise not parallel to the longitudinal axis of the shaft assembly). As shown in FIGS. 7A-7B, a spring actuator 740 may convert the translational movement of a translational/axial input to the crown to a force in a different direction, which actuates a non-axial mounted switch element (or other suitable switch or sensing mechanism). The spring actuator 740 may interact with the shaft assembly between the outer ends of the shaft assembly (e.g., between the knob and the distal end of the shaft assembly), allowing the rotational supports to be positioned further apart than may be achieved when translation-sensing components are positioned at the end of the rotating structure (e.g., when a switch element is positioned at an end of a shaft assembly 206, as shown in FIG. 2).

FIG. 7A illustrates a crown 704 positioned along a side wall 702 of a device 700 (which may correspond to or be an embodiment of the device 100). The crown 704 (which may generally correspond to or be an embodiment of the crown 112) may include a knob 708 that is external to the housing and configured to receive a rotational input, and a shaft assembly 706 that is coupled to the knob and extends through an opening 703 in the housing such that it is at least partially within the housing. The knob 708 and shaft assembly 706 may generally correspond to the knob 208 and shaft assembly 206 in FIG. 2, and the description of those components applies equally to the knob 708 and the shaft assembly 706.

A rotation sensing unit 710 (FIG. 7B) may detect rotation of the shaft assembly (e.g., a speed and a direction of rotation of the shaft assembly 706). The rotation sensing unit 710 may generally correspond to the rotation sensing unit 210 in FIG. 2, and the description of the rotation sensing unit 210 applies equally to the rotation sensing unit 710.

The shaft assembly 706 may include a rotor 711. The rotor 711 may define a surface (e.g., a peripheral exterior surface or reflecting surface) from which the rotation sensing unit 710 detects rotation of the shaft assembly 706. The rotor 711 may generally correspond to the rotor 211 in FIG. 2, and the description of the rotor 211 applies equally to the rotor 711. The rotor 711 may also define a rotational interface surface that is supported by a rotational support, as described herein.

A collar 714 may abut and/or be coupled to the housing (e.g., the side wall 702) and extend at least partially through the opening 703. The collar 714 may define a first rotational support 726 proximate the knob 708, and a support structure 737 may define a second rotational support 733 proximate the distal end of the shaft assembly 706 (e.g., the end of the rotating structure that is opposite the knob 708). Similar to the rotational supports of FIG. 3, the collar 714 (or the bushing 728) may define the first rotational support 726. In the illustrated example, the bushing 728 is positioned between an interface surface of the knob 708 and the first rotational support 726. The bushing 728 may be similar to the bushing 328 in FIG. 3, and the description of the bushing 328 applies equally to the bushing 728.

The support structure 737 may be coupled to the collar 714, and may define the second rotational support 733. As shown, the second rotational support 733 may be defined by the support structure 737, and/or by a bushing 732. Where the bushing 732 is fixed to the support structure 737 (e.g., such that the bushing 732 does not rotate relative to the support structure 737), the bushing 732 may define or be part of the second rotational support. The bushing 732 may generally correspond to the bushing 333 in FIG. 3, and the description of the bushing 333 applies equally to the bushing 732.

The crown 704 may include one or more sealing members 718, 739 positioned between components of the crown 704 and/or the device 700. The sealing members 718, 739 may inhibit the ingress of liquids, dust, or other contaminants into the device and/or between components. In some cases, a sealing member (e.g., the sealing member 739) may define a sliding interface between one or more surfaces of the crown 704.

As described above, the switch element in the crown 704 may be positioned along a side of the shaft assembly, and actuated by a mechanism that changes the direction of force applied to the knob 708 (e.g., an axial force) in order to actuate the switch element with a force along a direction that is not parallel to the input force. This arrangement allows the switch element to be actuated without it being positioned past the distal end of the shaft assembly, thereby allowing the distal end of the shaft assembly to be used for the inboard rotational support (and resulting in a shorter overall length of the crown components without compromising performance).

Returning to FIG. 7A, the crown 704 includes a spring actuator 740. The spring actuator 740 may be coupled to the support structure 737. In some cases, a portion of the spring actuator 740 is embedded in the support structure 737. For example, the support structure 737 may be formed form a polymer material, and may encapsulate part of the spring actuator 740 via insert molding. The spring actuator 740 may define an opening 741, through which a portion of the shaft assembly 706 (e.g., the rotor 711) may extend. The spring actuator 740 may be formed from a metal or other compliant material.

The spring actuator 740 may define a fixed portion 749, a deflecting portion 743, and an actuation portion 748. The fixed portion 749 may be coupled to the support structure 737. The deflecting portion 743 may resemble a dome or otherwise be configured to deflect or collapse in response to a force applied by the shaft assembly 706 (e.g., the rotor 711). This deflection results in the actuation portion 748 translating towards the switch element 720 and ultimately actuating the switch element 720. More particularly, because the fixed portion 749 of the spring actuator 740 is fixed to the support structure 737, the deformation of the deflecting portion 743, caused by translation of the shaft assembly 706 along direction 744, causes the actuation portion 748 to translate towards the switch element 720, along direction 746, ultimately actuating the switch element 720. The spring actuator 740 may be formed from or include a compliant material, such as a metal, polymer, composite, or another suitable material. The spring actuator 740 may also provide a biasing force to bias the crown 704 outward. For example, the spring actuator 740 may act as a spring that deflects inwards when the crown 704 is pressed inwards, and applies a returning force to push the crown 704 back outwards (e.g., towards its rest position) when the translational force is removed from the knob 708.

As described herein with respect to other switch elements, the switch element 720 may be operatively coupled to a processing system that detects actuation of the switch element 720 (e.g., by detecting closure of a circuit when the switch element 720 collapses). The switch element 720 may also provide a tactile output that may be felt or otherwise perceived by the user. For example, the user may feel a click, detent, or other sensation upon the collapse of the switch element 720, thus indicating to the user that an input has been successfully provided to the device.

By actuating the switch element 720 with a mechanism other than the shaft, the switch element 720 does not experience a sliding friction when the crown is rotated, which may obviate the need to include friction mitigating materials and construction between the shaft assembly and the switch element. In some cases, less robust switch elements may be used, as the switch does not experience as much friction as in other examples.

In cases where a crown is used as an electrode for a biometric or physiological sensor, the crown may define a conductive path from a conductive surface of the knob 708 to a processing system that determines a biological parameter of a user based at least in part on a voltage detected at the conductive surface. For example, a surface of the knob 708 (e.g., the end surface defined by a cap portion) may be formed from a conductive material, and may be conductively coupled to the shaft assembly 706, which may also be formed from a conductive material or otherwise define a conductive path. The spring actuator 740 may contact the shaft assembly 706 (e.g., at a surface of the rotor 711), and a conductive element (e.g., a conductive trace, wire, flexible circuit board or other conductive element) may conductively couple the spring actuator 740 to the processing system that determines the biological parameter. In such cases, the spring actuator 740 may be formed from or include a conducive material (e.g., metal).

As noted above, in crowns that are used as a conductive path for detecting a biological parameter, the crown may need to be electrically isolated from other conductive components and systems. Accordingly, the switch element 720 may be electrically insulated from the spring actuator 740, such as via a nonconductive member 750 (FIG. 7B) between the actuation portion 748 and a surface of the switch element 720, or a non-conductive coating or covering over the switch element 720.

Figure 8A:
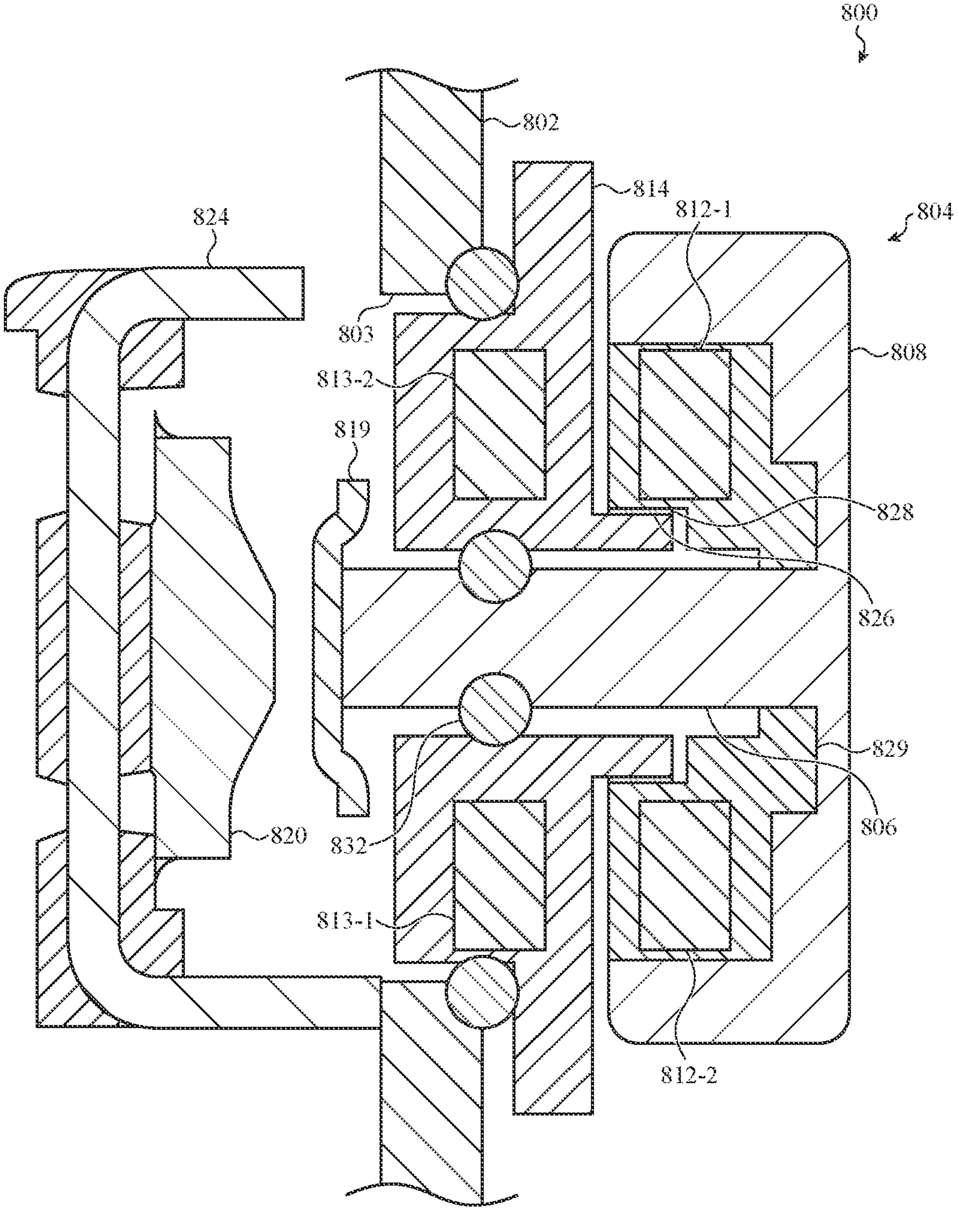
FIG. 8A depicts a partial cross-sectional view of a device with an example crown having sets of coils to detect rotation.
Figure 8B:
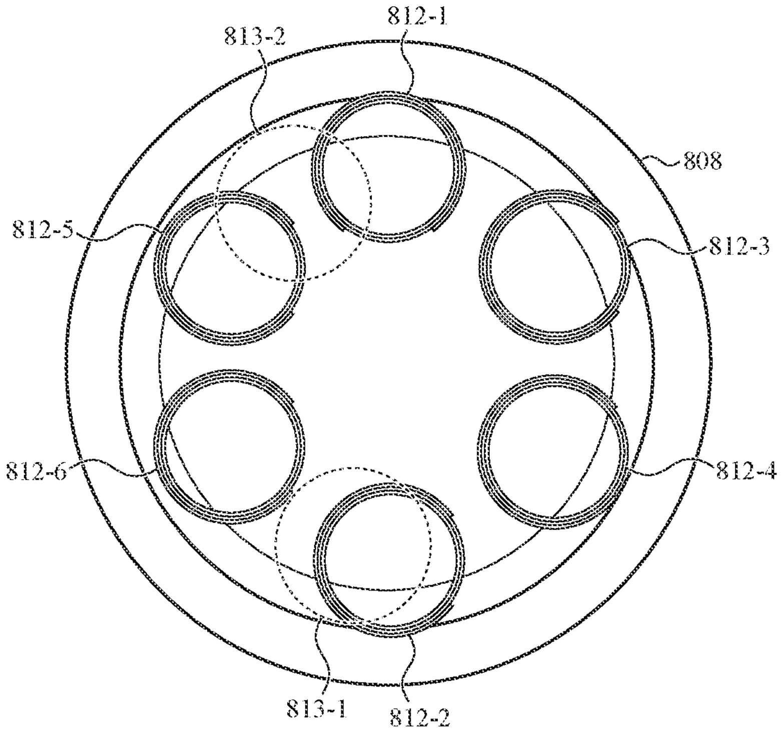
FIG. 8B depicts an end view of the crown of FIG. 8A.

FIGS. 8A-8B depict another example crown that may be used with an electronic device. For example, FIG. 8A depicts a partial cross-sectional view of a device 800 with an example crown input system 804 (also referred to herein simply as a crown 804), and FIG. 8B depicts an end view of the knob 808 of the crown 804.

The crown 804 in FIGS. 8A-8B uses sets of coils in rotating and non-rotating components to determine rotation of the crown (e.g., a speed and a direction of rotation of the crown rotation).

The crown 804 is positioned along a side wall 802 of the device 800 (which may correspond to or be an embodiment of the device 100). The crown 804 (which may generally correspond to or be an embodiment of the crown 112) may include a knob 808 that is external to the housing and configured to receive a rotational input, and a shaft assembly 806 that is coupled to the knob and extends through an opening 803 in the housing such that it is at least partially within the housing. The knob 808 and shaft assembly 806 may generally correspond to the knob 208 and shaft assembly 206 in FIG. 2, and the description of those components applies equally to the knob 808 and the shaft assembly 806.

A collar 814 may abut the housing (e.g., the side wall 802) and extend at least partially through the opening 803. A support structure 824 may be positioned within the device and may support components of the crown, as described herein. The support structure 824 may be coupled to the side wall 802 or another structure of the device. The collar 814 may define a first rotational support 826 proximate the knob 808, and a sealing member 832 may define a second rotational support. A bushing 828 may be positioned between the knob 808 and the first rotational support 826, as described with respect to other figures.

Rotation of the crown 804 may be detected by detecting changing electrical characteristics in a set of sensor coils 813 (e.g., 813-1, 813-2) positioned in a non-rotating portion of the crown, such as the collar 814. In some cases, the collar 814 is formed from a polymer or other moldable material, and the sensor coils 813 are at least partially embedded in the material of the collar 814.

The sensor coils 813 may be conductively coupled to sensor circuitry (e.g., a processor and/or other components) that provides electrical signals to the sensor coils 813 and detects electrical changes in the sensor coils 813 due to the presence and/or movement of a set of rotor coils 812 (e.g., 812-1-812-6, shown in FIG. 8B) relative to the sensor coils 813. For example, the sensor circuitry may supply the sensor coils 813 with an electrical signal, which results in the sensor coils 813 producing magnetic fields. When a rotor coil 812 moves through the magnetic field of a sensor coil 813, changes to the magnetic field are induced, which may be detected in the sensor coil 813 by the sensing circuitry. By monitoring the changes in the magnetic fields of the sensor coils 813 (in which the changes are produced by movement of the rotor coils 812 through the magnetic fields), the sensor circuitry may determine the speed and/or direction of rotation of the crown.

The rotor coils 812 may be attached to the knob 808 of the crown. In some cases, they are at least partially encapsulated in a polymer or other moldable material 829 of the knob 808 (e.g., via an insert molding process).

FIG. 8B illustrates an example arrangement of sensor coils 813 and rotor coils 812 in the crown 804. In some examples, the sensor coils and the rotor coils may be arranged at different pitches relative to each other, which may allow the sensing circuitry to determine both a speed and a direction of rotation of the crown. While FIG. 8B shows one example arrangement of sensor and rotor coils, this is merely for illustration, and other arrangements are also contemplated, and may be selected based on factors such as the number of sensor coils and rotor coils.

By positioning the rotation sensing components (e.g., the rotor coils and the sensor coils) substantially outside of the device, the overall length of the crown and its components into the interior volume of the device may be reduced. In particular, this rotation sensing system may replace optical sensors that are positioned inside the device and that sense rotation from a portion of the shaft assembly that is within the device, thus resulting in a shorter overall length of the crown.

In this example, a switch element 820 may be positioned past a distal end of the shaft assembly 806 and may be actuated by a translation of the shaft assembly 806 (e.g., in response to a translational or axial input to the knob 808). A friction guard 819 may be positioned between the switch element 820 and the distal end of the shaft assembly 806. The friction guard 819 and/or the switch element 820 may provide a biasing force to bias the crown 804 outward.

In cases where the crown is used as an electrode for a biometric or physiological sensor, the friction guard 819 may define a conductive path from a conductive surface of the knob 808 to a processing system that determines a biological parameter of a user based at least in part on a voltage detected at the conductive surface. For example, a surface of the knob 808 (e.g., the end surface) may be formed from a conductive material, and may be conductively coupled to the shaft assembly 806, which may also be formed from a conductive material or otherwise define a conductive path. The friction guard 819 may contact the conductive shaft assembly 806, and may be conductively coupled to the processing system that determines the biological parameter.

Figure 9:
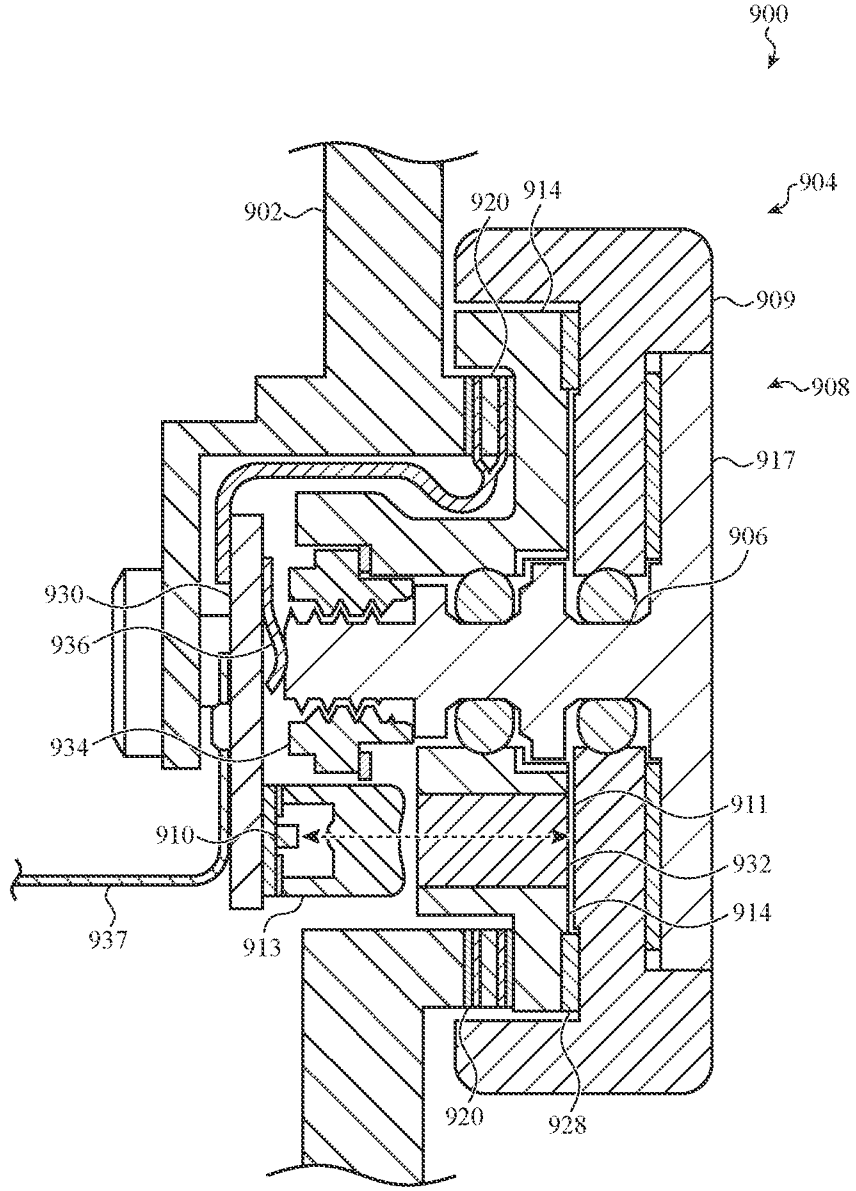
FIG. 9 depicts a partial cross-sectional view of a device with an example crown having a force sensor and a rotation sensor.

FIG. 9 depicts another example crown that may be used with an electronic device. More particularly, and as described herein, the crown in FIG. 9 uses a force sensor that detects translational and/or axial inputs without interacting with the shaft assembly directly and that may be positioned generally outside the device, thus reducing the overall volume occupied by the crown components within the device. Furthermore, the crown in FIG. 9 may use a rotation sensing unit that detects rotation of a component that is outside of the interior volume of the housing, which may also reduce the overall volume occupied by the crown components.

With reference to FIG. 9, a crown input system 904 (also referred to herein simply as a crown 904) is positioned along a side wall 902 of a device 900 (which may correspond to or be an embodiment of the device 100). The crown 904 (which may generally correspond to or be an embodiment of the crown 112) may include a knob 908 that is external to the housing and configured to receive a rotational input, and a shaft assembly 906 that is coupled to the knob and extends at least partially through an opening in the housing.

The knob 908 may be defined by a cap portion 917 of the shaft assembly 906 and a ring member 909. The cap portion 917 and the ring member 909 may be coupled together via adhesive, mechanical interlocking structures, fasteners, or the like. In some cases, they may be a unitary structure, such as a single piece of metal or polymer.

A collar 914 may abut the housing (e.g., the side wall 902) and extend at least partially through an opening in the housing. A shaft assembly 906 may extend through a hole in the collar 914, and a nut 934 may be coupled to the end of the shaft assembly 906 and may define a flange that retains the shaft assembly 906 to the device.

The knob 908 may be configured to rotate relative to the collar 914. For example, a bushing 928 may be positioned between surfaces of the knob 908 and the collar 914 to facilitate rotation of the knob 908 relative to the collar 914. In some cases, a coating or a surface treatment may be used instead of or in addition to the bushing 928. The bushing 928 may also form an environmental seal between rotating components of the crown (e.g., the ring member 909 of the crown 904) and non-rotating components (e.g., the collar 914). The bushing 928 may prevent or inhibit ingress of water, liquids, dust, or other contaminants into the area between the knob 908 and the collar 914.

A force sensing element 920 may be positioned between the collar 914 and the housing (e.g., a portion of the side wall 902). When a translational and/or axial input force is applied to the knob 908, the force sensing element 920 may be compressed and/or otherwise subjected to a force, which may be detected by sensing circuitry coupled to or incorporated with the force sensing element 920. The detected force may be used to control an operation of the device.

The force sensing element 920 and associated circuitry (which may generally be referred to as a force sensing system) may produce an output that continuously varies in accordance with the input force. In some cases, the force sensing system determines whether an input satisfies a threshold level, and provides a binary signal or output based on whether the threshold is satisfied (e.g., similar to a switch element). For example, if the force sensing system detects a force value satisfying a threshold, the force sensing system may output a signal indicating that the crown has been actuated. The device may then perform an operation in response to detecting the force value that satisfied the threshold. In some cases, the force sensing system may include multiple thresholds, such that different forces result in different operations being performed by the device.

The force sensing element 920 may include two conductive elements separated by a gap. A compliant material, such as a polymer foam, elastomer, or the like, may be positioned between the electrodes. When the force sensing element 920 is compressed, the gap between the conductive elements may be reduced. The change in the gap may be detected by the sensing circuitry by detecting changes in electrical characteristics of the conductive elements, such as a change in capacitance between the conductive elements. In such cases, one of the conductive elements may be a drive electrode and the other may be a sense electrode, to facilitate the detection of capacitance changes by the sensing circuitry.

Other types of force sensing systems may be used instead of or in addition to the capacitive sensing. For example, strain gauges may be used to detect an amount of strain applied to a component of the force sensing element 920. As another example, the force sensing element 920 may include piezoelectric and/or piezoresistive elements, and the sensing circuitry may detect the input force based on the changes in the properties of the piezo elements.

As shown, the force sensing element 920 does not require actuation by the shaft assembly, and is positioned generally outside of the internal volume of the housing. Accordingly, the positioning of the force sensing element 920 provides force sensing functionality (e.g., to detect translational and/or axial inputs) while occupying less internal volume within the device.

In order to detect rotation of the crown 904, a rotation sensing element 910 may use light reflected from an interface surface 911 of the knob 908. In particular, the interface surface rotates relative to the rotation sensing element 910 (and relative to the collar 914), and the rotation sensing element 910 may use light reflected by the interface surface 911 to determine a speed and a direction of rotation of the knob 908.

The rotation sensing element 910 may emit light through a lens 913 and through an optical passage 932. The lens 913 may direct the light along a target path towards the interface surface 911. The optical passage 932 may provide an optical path through the collar 914, and may or may not provide any lensing for the light. A portion of the emitted light may be reflected by the interface surface 911 and pass through the optical passage 932 and the lens 913. In some cases, the rotation sensing element 910 uses self-mixing laser interferometry to determine characteristics of the rotation. In such cases, the rotation sensing element 910 may emit a laser beam onto the interface surface 911 and an interference (or other interaction) between the emitted laser beam and the reflected laser beam may be used to determine the rotational characteristics. In examples where the rotation sensing element 910 uses self-mixing interferometry, the laser beam that is incident on the interface surface 911 may have an angle of incidence that is oblique to the interface surface 911, such that the motion of the interface surface 911 causes the reflected light to interfere with the emitted light in a manner that facilitates detection of the rotational characteristics of the knob 908.

In another example, the rotation sensing element 910 may include an image sensor (and optionally an illuminator) to detect characteristics of the rotational inputs by analyzing images of the interface surface 911 as it rotates. As another example, the rotation sensing element 910 may include a light emitter that emits light onto the interface surface 911 (which may have markings, grooves, features, patterns, etc.), and a light detector that detects a portion of the emitted light that is reflected by the rotating surface. The detector may determine parameters or characteristics of the rotation (e.g., speed and direction) based on properties or parameters of the reflected light.

Similar to the configuration of the force sensing system, the optical sensing system in the example of FIG. 9 detects the rotation of a component that is generally outside of the interior volume of the device, and does not rely on interaction with the shaft assembly 906 or any other rotating structure within the interior volume. Accordingly, the configuration of the rotation sensing element 910 provides rotation sensing functionality while occupying less internal volume within the device.

In cases where the crown 904 is used as an electrode for a biometric or physiological sensor, the crown 904 may define a conductive path from a conductive surface of the knob 908 to a processing system that determines a biological parameter of a user based at least in part on a voltage detected at the conductive surface. For example, a surface of the knob 908 (e.g., the end surface defined by the cap portion 917) may be formed from a conductive material, and may be conductively coupled to the shaft assembly 906, which may also be formed from a conductive material or otherwise define a conductive path. A conductive contact 936 (which may be mounted to a substrate or other support member 930) may contact the shaft assembly 906 (e.g., at the axial end surface at the distal end of the shaft assembly 906), and a conductive element 937 (e.g., a conductive trace, wire, flexible circuit board or other conductive element) may conductively couple the conductive contact 936 to the processing system that determines the biological parameter. The conductive contact 936 may generally correspond to the conductive contact 336 in FIG. 3, and the description of the conductive contact 336 applies equally to the conductive contact 936.

The conductive contact 936 may also provide a biasing force to bias the crown 904 outward. For example, the conductive contact 936 may act as a spring that deflects inwards when the crown is pressed inwards, and applies a returning force to push the crown 904 back outwards (e.g., towards its rest position) when the translational force is removed from the knob 908.

Figure 10A:
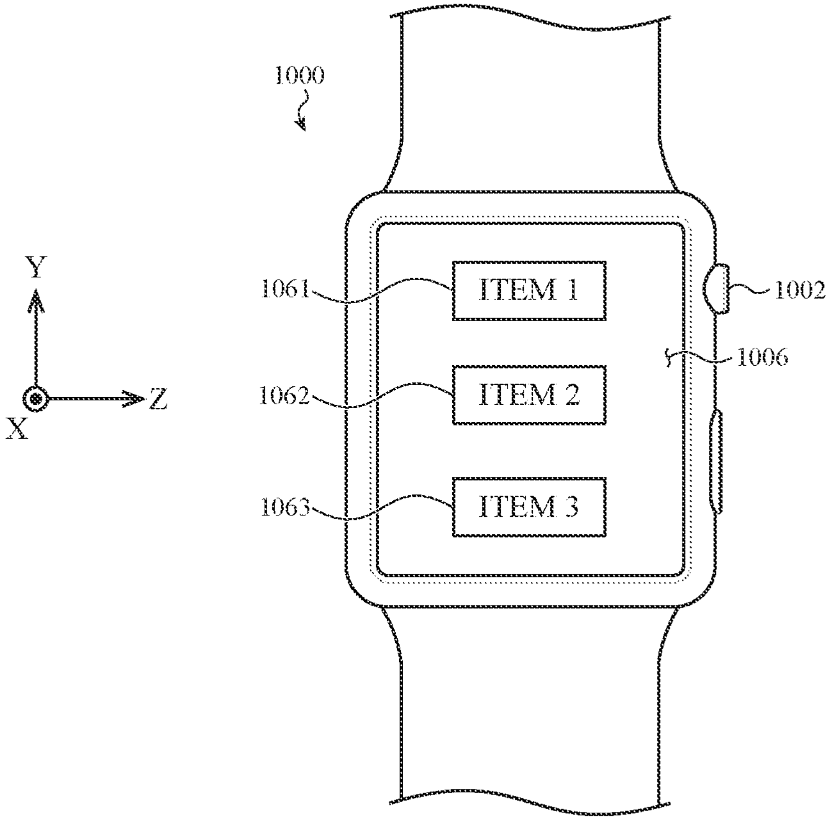
FIGS. 10A-12B depict examples of controlling operations of an electronic device based on inputs provided by force and/or rotational inputs to a crown of the device.

FIG. 10A depicts an example electronic device 1000 (shown here as an electronic watch) having a crown 1002. The crown 1002 may be similar to the examples described above, and may receive rotational inputs and translational inputs (also referred to as force inputs) along an axial direction of the crown. A display 1006 provides a graphical output (e.g., shows information and/or other graphics). In some embodiments, the display 1006 may be configured as a touch-sensitive display capable of receiving touch and/or force input. In the current example, the display 1006 depicts a list of various items 1061, 1062, 1063, all of which are example indicia.

Figure 10B:
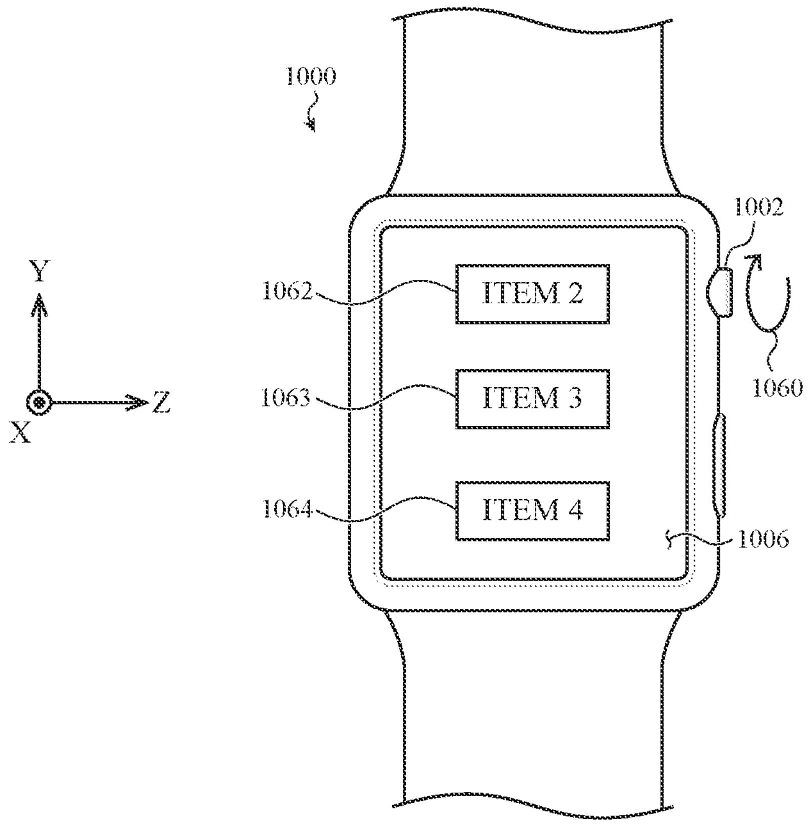

FIG. 10B illustrates how the graphical output shown on the display 1006 changes as the crown 1002 rotates, partially or completely (as indicated by the arrow 1060). Rotating the crown 1002 causes the list to scroll or otherwise move on the screen, such that the first item 1061 is no longer displayed, the second and third items 1062, 1063 each move upwards on the display, and a fourth item 1064 is now shown at the bottom of the display. This is one example of a scrolling operation that can be executed by rotating the crown 1002. Such scrolling operations may provide a simple and efficient way to depict multiple items relatively quickly and in sequential order. A speed of the scrolling operation may be controlled by the amount of rotational force applied to the crown 1002 and/or the speed at which the crown 1002 is rotated. Faster or more forceful rotation may yield faster scrolling, while slower or less forceful rotation yields slower scrolling. The crown 1002 may receive an axial or translational force (e.g., a force inward toward the display 1006 or watch body) to select an item from the list, in certain embodiments.

Figure 11A:
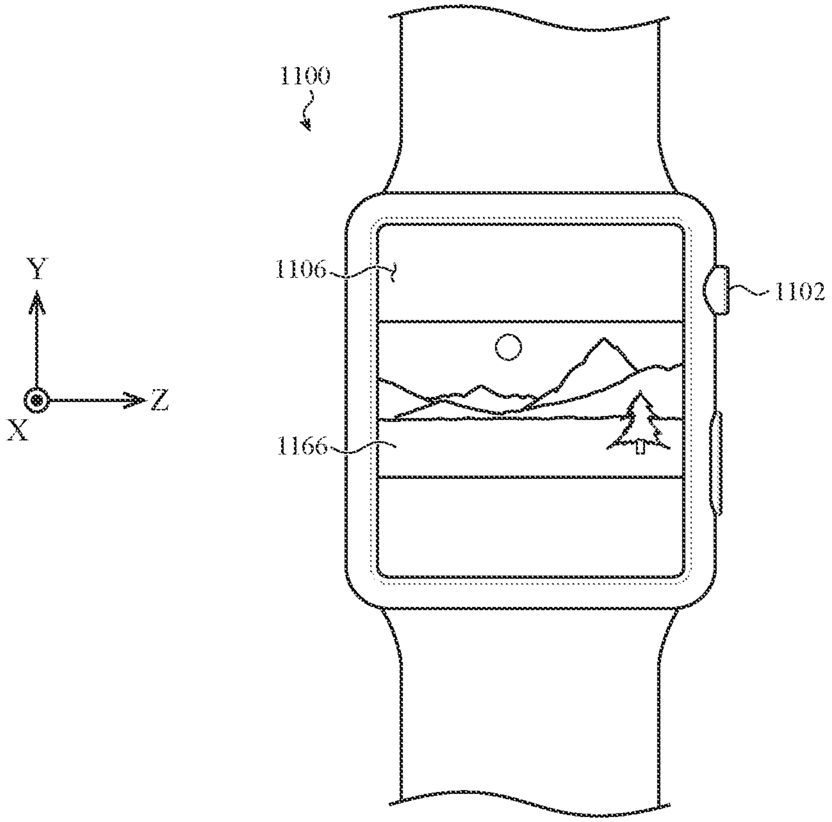
Figure 11B:
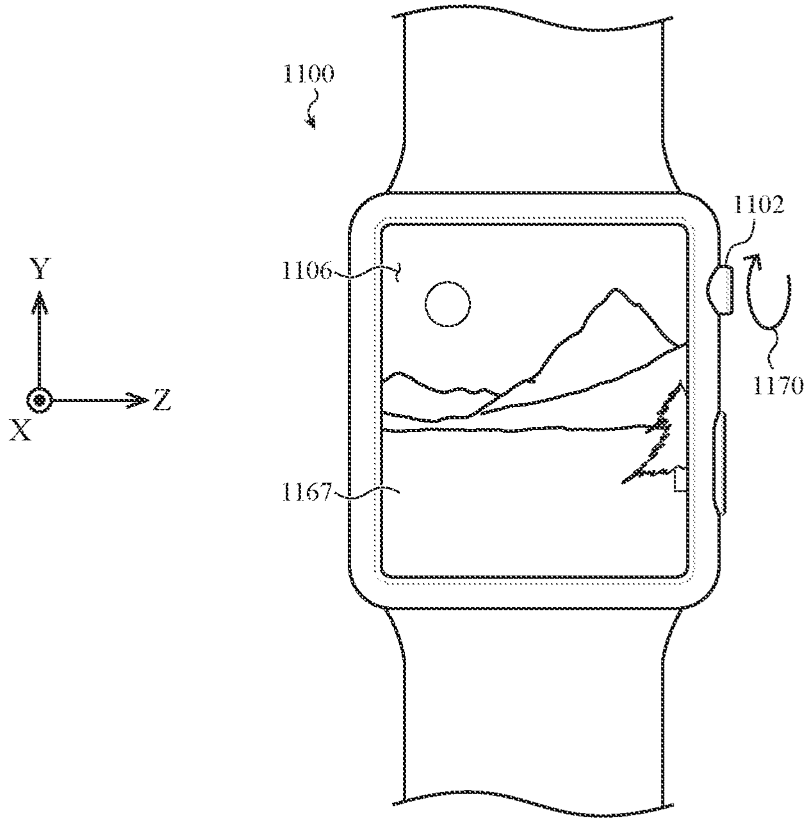

FIGS. 11A and 11B illustrate an example zoom operation. The display 1106 of the device 1100 depicts a picture 1166 at a first magnification, shown in FIG. 11A; the picture 1166 is yet another example of an indicium. As the crown 1102 is rotated (illustrated by arrow 1170), the display may zoom into the picture, such that a portion 1167 of the picture is shown at an increased magnification (shown in FIG. 11B). The direction of zoom (in vs. out) and speed of zoom, or location of zoom, may be controlled through rotation of the crown 1102, and particularly through the direction of rotation and/or speed of rotation. Rotating the crown 1102 in a first direction may zoom in, while rotating the crown in an opposite direction may zoom out. Alternately, rotating the crown in a first direction may change the portion of the picture subject to the zoom effect.

Figure 12A:
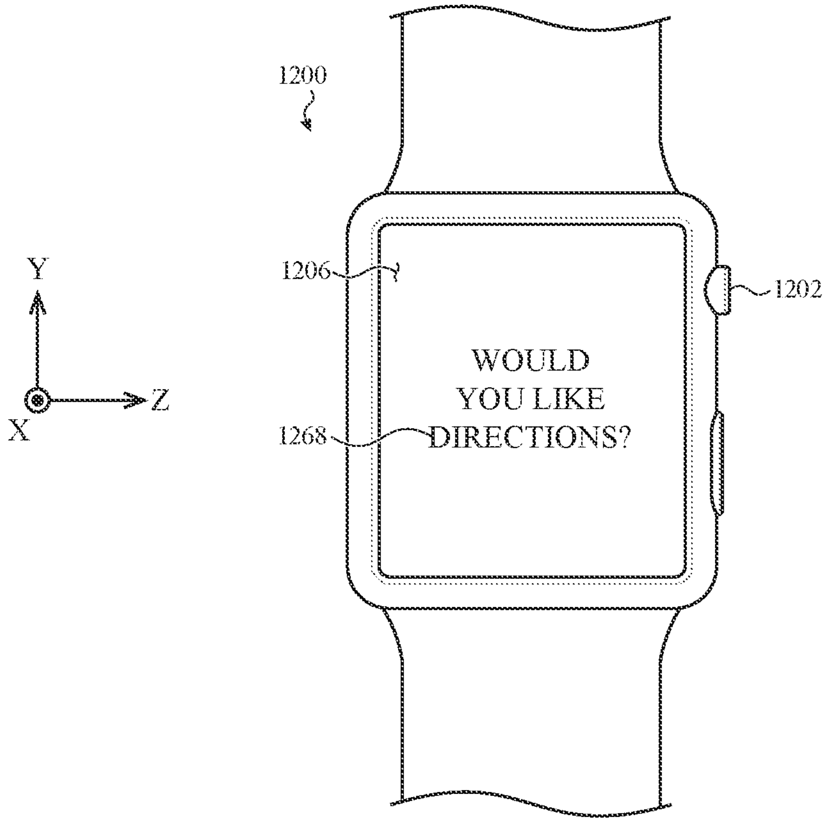
Figure 12B:
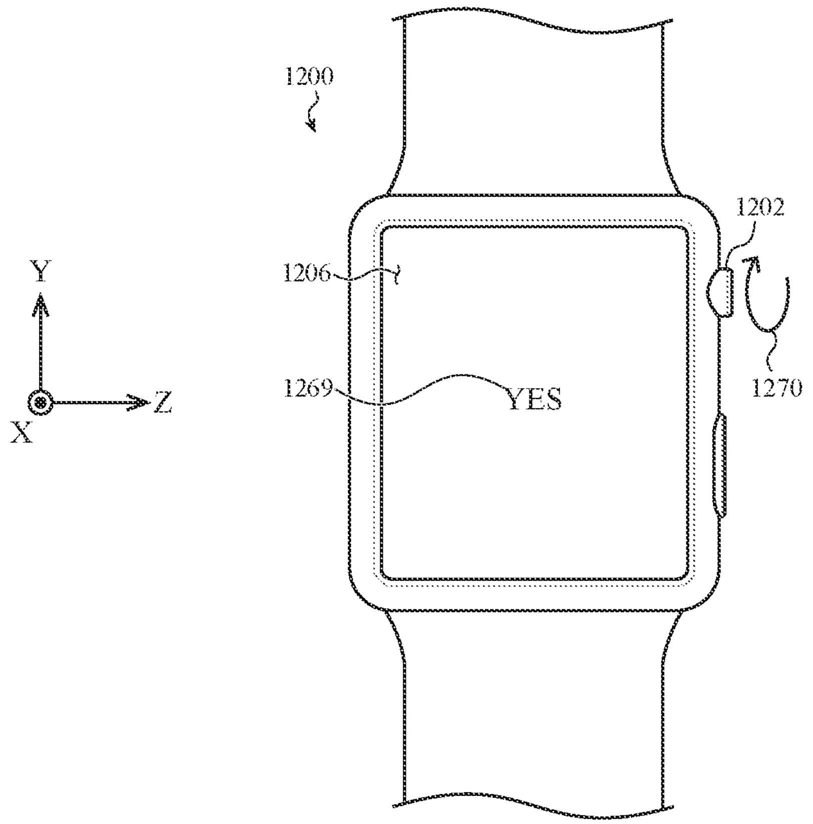

FIGS. 12A and 12B illustrate possible use of the crown 1202 to change an operational state of the electronic device 1200 or otherwise toggle between inputs. Turning first to FIG. 12A, the display 1206 depicts a question 1268, namely, "Would you like directions?" As shown in FIG. 12B, the crown 1202 may be rotated (illustrated by arrow 1270) to answer the question. Rotating the crown provides an input interpreted by the electronic watch 1200 as "yes," and so "YES" is displayed as a graphic 1269 on the display 1206. Rotating the crown 1202 in an opposite direction may provide a "no" input. In the embodiment shown in FIGS. 12A-12B, the crown's rotation is used to directly provide the input, rather than select from options in a list (as discussed above with respect to FIGS. 10A-10B).

As mentioned previously, force (e.g., axial inputs) or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input).

Figure 13:
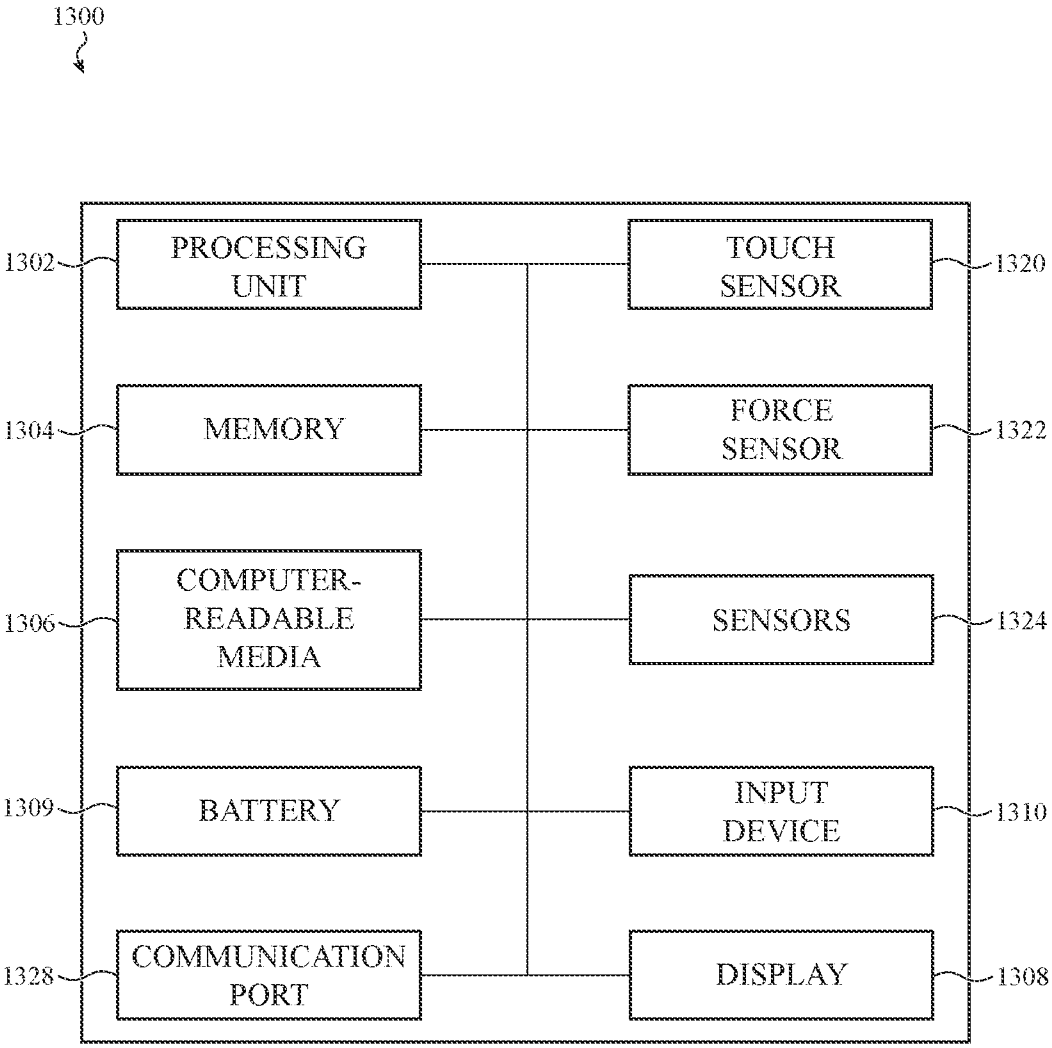
FIG. 13 depicts example components of an electronic device.

FIG. 13 depicts an example schematic diagram of an electronic device 1300. By way of example, the device 1300 of FIG. 13 may correspond to the wearable electronic device 100 shown in FIGS. 1A-1B (or any other wearable electronic device described herein). To the extent that multiple functionalities, operations, and structures are disclosed as being part of, incorporated into, or performed by the device 1300, it should be understood that various embodiments may omit any or all such described functionalities, operations, and structures. Thus, different embodiments of the device 1300 may have some, none, or all of the various capabilities, apparatuses, physical features, modes, and operating parameters discussed herein.

As shown in FIG. 13, a device 1300 includes a processing unit 1302 operatively connected to computer memory 1304 and/or computer-readable media 1306. The processing unit 1302 may be operatively connected to the memory 1304 and computer-readable media 1306 components via an electronic bus or bridge. The processing unit 1302 may include one or more computer processors or microcontrollers that are configured to perform operations in response to computer-readable instructions. The processing unit 1302 may include the central processing unit (CPU) of the device. Additionally or alternatively, the processing unit 1302 may include other processors within the device including application specific integrated chips (ASIC) and other microcontroller devices.

The memory 1304 may include a variety of types of non-transitory computer-readable storage media, including, for example, read access memory (RAM), read-only memory (ROM), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media including, for example, a hard-drive storage device, a solid-state storage device, a portable magnetic storage device, or other similar device. The computer-readable media 1306 may also be configured to store computer-readable instructions, sensor values, and other persistent software elements.

In this example, the processing unit 1302 is operable to read computer-readable instructions stored on the memory 1304 and/or computer-readable media 1306. The computer-readable instructions may adapt the processing unit 1302 to perform the operations or functions described herein. In particular, the processing unit 1302, the memory 1304, and/or the computer-readable media 1306 may be configured to cooperate with a sensor 1324 (e.g., a rotation sensor that senses rotation of a crown component) to control the operation of a device in response to an input applied to a crown of a device (e.g., the crown 112 or any other crown described herein). The computer-readable instructions may be provided as a computer-program product, software application, or the like.

As shown in FIG. 13, the device 1300 also includes a display 1308. The display 1308 may include a liquid-crystal display (LCD), organic light emitting diode (OLED) display, light emitting diode (LED) display, or the like. If the display 1308 is an LCD, the display 1308 may also include a backlight component that can be controlled to provide variable levels of display brightness. If the display 1308 is an OLED or LED type display, the brightness of the display 1308 may be controlled by modifying the electrical signals that are provided to display elements. The display 1308 may correspond to any of the displays shown or described herein.

The device 1300 may also include a battery 1309 that is configured to provide electrical power to the components of the device 1300. The battery 1309 may include one or more power storage cells that are linked together to provide an internal supply of electrical power. The battery 1309 may be operatively coupled to power management circuitry that is configured to provide appropriate voltage and power levels for individual components or groups of components within the device 1300. The battery 1309, via power management circuitry, may be configured to receive power from an external source, such as an AC power outlet. The battery 1309 may store received power so that the device 1300 may operate without connection to an external power source for an extended period of time, which may range from several hours to several days.

In some embodiments, the device 1300 includes one or more input devices 1310. An input device 1310 is a device that is configured to receive user input. The one or more input devices 1310 may include, for example, a crown input system (e.g., any of the crowns described herein), a push button, a touch-activated button, a keyboard, a keypad, or the like (including any combination of these or other components). In some embodiments, the input device 1310 may provide a dedicated or primary function, including, for example, a power button, volume buttons, home buttons, scroll wheels, and camera buttons.

The device 1300 may also include one or more sensors 1324. The sensors 1324 may detect inputs provided by a user to a crown of the device (e.g., the crown 112 or any other crown described herein). The sensors 1324 may include sensing circuitry and other sensing components that facilitate sensing of rotational motion of a crown, as well as sensing circuitry and other sensing components (optionally including a switch) that facilitate sensing of translational and/or axial motion of the crown (or axial force applied to the crown). The sensors 1324 may include components such as an optical sensing unit, a tactile or dome switch, or any other suitable components or sensors that may be used to provide the sensing functions described herein. The sensors 1324 may also include a biometric sensor, such as a heart rate sensor, electrocardiograph sensor, temperature sensor, or any other sensor that conductively couples to the user and/or to the external environment through a crown input system, as described herein. In cases where the sensors 1324 include a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 1300 may also include a touch sensor 1320 that is configured to determine a location of a touch on a touch-sensitive surface of the device 1300 (e.g., an input surface defined by the portion of a cover 108 over a display 109). The touch sensor 1320 may use or include capacitive sensors, resistive sensors, surface acoustic wave sensors, piezoelectric sensors, strain gauges, or the like. In some cases, the touch sensor 1320 associated with a touch-sensitive surface of the device 1300 may include a capacitive array of electrodes or nodes that operate in accordance with a mutual-capacitance or self-capacitance scheme. The touch sensor 1320 may be integrated with one or more layers of a display stack (e.g., the display 109) to provide the touch-sensing functionality of a touchscreen. Moreover, the touch sensor 1320, or a portion thereof, may be used to sense motion of a user's finger as it slides along a surface of a crown, as described herein.

The device 1300 may also include a force sensor 1322 that is configured to receive and/or detect force inputs applied to a user input surface of the device 1300 (e.g., the display 109). The force sensor 1322 may use or include capacitive sensors, resistive sensors, surface acoustic wave sensors, piezoelectric sensors, strain gauges, or the like. In some cases, the force sensor 1322 may include or be coupled to capacitive sensing elements that facilitate the detection of changes in relative positions of the components of the force sensor (e.g., deflections caused by a force input). The force sensor 1322 may be integrated with one or more layers of a display stack (e.g., the display 109) to provide force-sensing functionality of a touchscreen. The force sensor 1322 may also correspond to the force sensing element and associated circuitry in FIG. 9.

The device 1300 may also include a communication port 1328 that is configured to transmit and/or receive signals or electrical communication from an external or separate device. The communication port 1328 may be configured to couple to an external device via a cable, adaptor, or other type of electrical connector. In some embodiments, the communication port 1328 may be used to couple the device 1300 to an accessory, including a dock or case, a stylus or other input device, smart cover, smart stand, keyboard, or other device configured to send and/or receive electrical signals.

As described above, one aspect of the present technology is the gathering and use of data from a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing defining a side wall;
a display;
a front cover positioned over the display; and
an input system configured to receive a rotational input and a translational input and comprising:
a switch element positioned within the housing and defining a first opening along a top of the switch element;
a crown comprising:
a knob external to the housing; and
a shaft assembly coupled to the knob and extending through a second opening in the side wall of the housing and through the first opening in the switch element, the shaft assembly defining an actuation feature configured to actuate the switch element in response to the translational input; and
a rotation sensing system configured to detect the rotational input.

2. The electronic watch of claim 1, wherein:
the rotation sensing system is an optical rotation sensing system configured to detect the rotational input based at least in part on light reflected from a surface of the crown;
the knob defines a conductive surface;
the electronic watch further comprises:
a battery within the housing; and
a processing system;
the processing system is operatively coupled to the battery, the switch element, and the optical rotation sensing system and configured to change a graphical output of the display in response to at least one of the translational input or the rotational input; and
the processing system is conductively coupled to the conductive surface through the shaft assembly and is configured to determine a biological parameter of a user based at least in part on a voltage detected at the conductive surface.

3. The electronic watch of claim 1, wherein:
the electronic watch further comprises a bracket assembly within the housing and defining a third opening;
the switch element is coupled to the bracket assembly; and
a portion of the crown extends into the third opening.

4. The electronic watch of claim 3, wherein:
the bracket assembly comprises a bushing positioned in the third opening; and
the bushing rotationally supports an end of the shaft assembly.

5. The electronic watch of claim 1, wherein:
the shaft assembly defines:
a barrel portion having a first diameter; and
an end portion extending from the barrel portion and having a second diameter less than the first diameter; and
the barrel portion defines the actuation feature of the shaft assembly.

6. The electronic watch of claim 5, wherein:

the electronic watch further comprises a bracket assembly within the housing and defining a third opening;

the switch element is coupled to the bracket assembly;

a bushing is positioned in the third opening and defines a fourth opening; and the end portion of the shaft assembly extends into the fourth opening of the bushing and is rotationally supported by the bushing.

7. The electronic watch of claim 1, wherein:

the rotation sensing system is configured to direct a laser beam onto a surface of the crown and receive a reflected portion of the laser beam; and the rotation sensing system determines a speed and a direction of the rotational input using self-mixing laser interferometry.

8. A wearable electronic device comprising:

a housing having a side wall and a first opening in the side wall;

a display;

an input system comprising:

a crown configured to receive a rotational input and a translational input and comprising:

a knob positioned along a side of the housing; and a shaft assembly coupled to the knob and extending through the first opening in the side wall;

a bracket assembly within the housing and comprising a rotational support for the crown;

a switch element coupled to the bracket assembly and defining a second opening through which a portion of the shaft assembly extends, the switch element configured to be actuated by the crown in response to the translational input; and a rotation sensing system configured to detect the rotational input; and a processing system operably coupled to the switch element, the rotation sensing system, and the display and configured to change a graphical output of the display in response to at least one of the translational input or the rotational input.

9. The wearable electronic device of claim 8, wherein:

the rotational support is a first rotational support; and the wearable electronic device further comprises a collar coupled to the housing and defining a second rotational support for the crown.

10. The wearable electronic device of claim 8, wherein the rotational support comprises a polymer bushing configured to contact a rotating surface of the shaft assembly.

11. The wearable electronic device of claim 10, wherein:

the bracket assembly defines a third opening;

the polymer bushing is positioned in the third opening in the bracket assembly and defines a fourth opening; and an end of the shaft assembly is positioned in the fourth opening of the polymer bushing.

12. The wearable electronic device of claim 8, wherein:

the crown defines a conductive surface along an exterior structure of the crown;

the conductive surface is conductively coupled to the processing system through the shaft assembly; and the processing system is configured to determine a biological parameter of a user based at least in part on a voltage detected at the conductive surface.

13. The wearable electronic device of claim 12, wherein the crown is conductively isolated from the switch element.

14. The wearable electronic device of claim 12, further comprising a friction guard positioned between the switch element and a surface of the shaft assembly and configured to conductively isolate the shaft assembly from the switch element.

15. An electronic watch comprising:

a housing;

a band attached to the housing;

a touch-sensitive display;

an input system coupled to the housing and comprising:

a crown configured to rotate and translate relative to the housing and comprising:

a shaft assembly extending through an opening in the housing and defining an actuation feature; and a knob coupled to a first end of the shaft assembly and positioned outside of the housing; and a bracket assembly within the housing and configured to rotationally support a second end of the shaft assembly opposite the first end of the shaft assembly;

a collapsible switch positioned around the shaft assembly and between the knob and the bracket assembly, the collapsible switch configured to be actuated by the actuation feature of the shaft assembly when the crown is translated;

a conductor, wherein the collapsible switch is configured to conductively couple to the conductor when the collapsible switch is actuated; and a rotation sensing system configured to detect a rotation of the crown; and a processing system operatively coupled to the collapsible switch and the conductor and configured to detect a translation of the crown based at least in part on detecting a conductive coupling between the collapsible switch and the conductor.

16. The electronic watch of claim 15, wherein:

the opening is a first opening;

the collapsible switch defines a second opening; and the shaft assembly extends through the second opening.

17. The electronic watch of claim 15, wherein the rotation sensing system comprises an optical sensing element configured to detect the rotation of the crown based at least in part on light reflected from a reflecting surface of the shaft assembly.

18. The electronic watch of claim 17, wherein the reflecting surface of the shaft assembly is between the bracket assembly and the switch element.

19. The electronic watch of claim 17, wherein the reflecting surface of the shaft assembly is between the collapsible switch and the knob.

20. The electronic watch of claim 15, wherein the crown is conductively isolated from the collapsible switch.

* * * * *